US010192194B2

(12) United States Patent
Bernhardt et al.

(10) Patent No.: US 10,192,194 B2
(45) Date of Patent: Jan. 29, 2019

(54) IN-VEHICLE PACKAGE LOCATION IDENTIFICATION AT LOAD AND DELIVERY TIMES

(71) Applicant: Hand Held Products, Inc., Fort Mill, SC (US)

(72) Inventors: Keith L. Bernhardt, Indian Land, SC (US); Sameer Agrawal, Weddington, NC (US); Mark Poole, Cedar Rapids, IA (US); Sherri Gansen, Cedar Rapids, IA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 503 days.

(21) Appl. No.: 14/944,405

(22) Filed: Nov. 18, 2015

(65) Prior Publication Data
US 2017/0140329 A1 May 18, 2017

(51) Int. Cl.
*G06Q 10/08* (2012.01)
*B65G 1/137* (2006.01)
(Continued)

(52) U.S. Cl.
CPC ......... *G06Q 10/087* (2013.01); *B65G 1/1371* (2013.01); *G06Q 10/083* (2013.01);
(Continued)

(58) Field of Classification Search
CPC ........ G06Q 30/00; G06Q 30/01; G06Q 50/00; G06Q 99/00; G06Q 10/00; G06Q 20/00; G06Q 10/02; G06Q 10/08
(Continued)

(56) References Cited

U.S. PATENT DOCUMENTS 5,671,362 A 9/1997 Cowe et al.
6,832,725 B2 12/2004 Gardiner et al.
(Continued)

FOREIGN PATENT DOCUMENTS

EP 1300348 A1 4/2003
WO 2008/107123 A1 9/2008
(Continued)

OTHER PUBLICATIONS

Extended European Search Report in counterpart European Application No. 16198998.3 dated Feb. 27, 2017, pp. 1-7.
(Continued)

*Primary Examiner* — Olusegun Goyea
(74) *Attorney, Agent, or Firm* — Additon, Higgins & Pendleton, P.A.

(57) ABSTRACT

A shelving and package locating system for delivery vehicles includes one or more shelves for storing packages within a delivery vehicle during delivery. Each package is associated with both a geographic delivery address and an assigned location on a particular shelf within the delivery vehicle. A GPS unit determines the location of the delivery vehicle during delivery, and a computer provides the shelf location of a particular package when that package's delivery-location information substantially corresponds to vehicle location information. Several embodiments exist for registering the location of the package in the vehicle at load time, such as scanned location indicia, light sensors on shelves, pressure sensors on shelves, pressure sensors on the floor of the vehicle, and light spot. Several embodiments exist for locating the package in the vehicle at delivery time, such as a pick-to-light system that employs variable length lighting and a light pointer system that generates a light spot.

24 Claims, 16 Drawing Sheets

(51) Int. Cl.
*G06Q 50/28* (2012.01)
*B60P 3/00* (2006.01)

(52) U.S. Cl.
CPC ......... *G06Q 10/0833* (2013.01); *G06Q 50/28* (2013.01); *B60P 3/007* (2013.01); *B65G 2209/04* (2013.01)

(58) Field of Classification Search
USPC ........ 705/7.25, 7.31, 7.33, 2, 28, 5, 218, 13, 705/75, 341, 338
See application file for complete search history.

(56) References Cited

U.S. PATENT DOCUMENTS

| | | | |
|---|---|---|---|
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,486,462 B1 * | 2/2009 | Starr | G11B 15/6885 360/69 |
| 7,561,533 B2 * | 7/2009 | Aklepi | G06Q 10/08 370/255 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,325,036 B1 * | 12/2012 | Fuhr | G06Q 10/087 340/5.92 |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,736,909 B2 | 5/2014 | Sato et al. | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |

(56) References Cited

U.S. PATENT DOCUMENTS

| | | |
|---|---|---|
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,134,426 B1* | 9/2015 | Siris .................. G01S 19/07 |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,684,730 B1* | 6/2017 | Grant ............... G06F 17/30879 |
| 2002/0177922 A1* | 11/2002 | Bloom ................. G06Q 20/00 700/213 |
| 2002/0178074 A1* | 11/2002 | Bloom ................. G06Q 10/08 705/26.81 |
| 2003/0036985 A1 | 2/2003 | Soderholm |
| 2003/0200129 A1* | 10/2003 | Klaubauf ......... G06Q 10/06315 705/7.25 |
| 2004/0133483 A1* | 7/2004 | Potter ................. G06Q 10/087 705/28 |
| 2005/0043886 A1* | 2/2005 | Stevens ............ G08G 1/096811 701/469 |
| 2005/0137933 A1* | 6/2005 | Holsen .................. G06Q 10/08 705/338 |
| 2006/0149634 A1* | 7/2006 | Pelegrin ............... G06Q 30/018 705/317 |
| 2007/0050271 A1* | 3/2007 | Ufford ................. G06Q 10/087 705/28 |
| 2007/0063048 A1 | 3/2007 | Havens et al. |
| 2008/0033769 A1* | 2/2008 | Koorapati ............. G06Q 10/02 705/5 |
| 2008/0183328 A1 | 7/2008 | Danelski |
| 2009/0099943 A1 | 4/2009 | Bodin et al. |
| 2009/0134221 A1 | 5/2009 | Zhu et al. |
| 2009/0322486 A1* | 12/2009 | Gerstel ................ B65G 1/1371 340/10.1 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0316470 A1* | 12/2010 | Lert ..................... B65G 1/045 414/273 |
| 2011/0169999 A1 | 7/2011 | Grunow et al. |
| 2011/0184751 A1* | 7/2011 | Holmes .............. G06F 19/3462 705/2 |
| 2011/0202554 A1 | 8/2011 | Powilleit et al. |
| 2011/0202591 A1* | 8/2011 | Reis ..................... G06Q 10/08 709/203 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0173435 A1* | 7/2013 | Cozad, Jr. ............ G06Q 10/087 705/28 |
| 2013/0175341 A1 | 7/2013 | Kearney et al. |
| 2013/0175343 A1 | 7/2013 | Good |
| 2013/0235206 A1* | 9/2013 | Smith .................. H04N 7/181 348/150 |
| 2013/0257744 A1 | 10/2013 | Daghigh et al. |
| 2013/0257759 A1 | 10/2013 | Daghigh |

(56) References Cited

U.S. PATENT DOCUMENTS

| | | |
|---|---|---|
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1* | 2/2014 | Kohtz .................. H03K 17/94 307/117 |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1* | 3/2014 | Ye .................. G06Q 10/0835 705/75 |
| 2014/0070005 A1 | 3/2014 | Nahill et al. |
| 2014/0071840 A1 | 3/2014 | Venancio |
| 2014/0074746 A1* | 3/2014 | Wang .................. G06Q 10/083 705/341 |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201041 A1 | 7/2014 | Meyer |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |

(56) References Cited

U.S. PATENT DOCUMENTS

| | | |
|---|---|---|
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1* | 7/2015 | Payne ............... G01S 19/14 701/1 |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | | |
|---|---|---|---|
| WO | 2013163789 A1 | 11/2013 | |
| WO | 2013173985 A1 | 11/2013 | |
| WO | 2014019130 A1 | 2/2014 | |
| WO | 2014110495 A1 | 7/2014 | |

OTHER PUBLICATIONS

Office Action in Related GB Application No. 1500926.9, dated Jul. 11, 2017, 7 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Combined Search and Exam Report in Related GB Application No. 1500926.9, dated Jul. 1, 2015, 6 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
Extended European Search Report in related European Application No. 18151836.6 dated Mar. 26, 2018, pp. 1-10.
Examination Report in Related GB Application No. 1500926.9, dated Mar. 29, 2018, 6 pages.

* cited by examiner

DELIVERY TIME

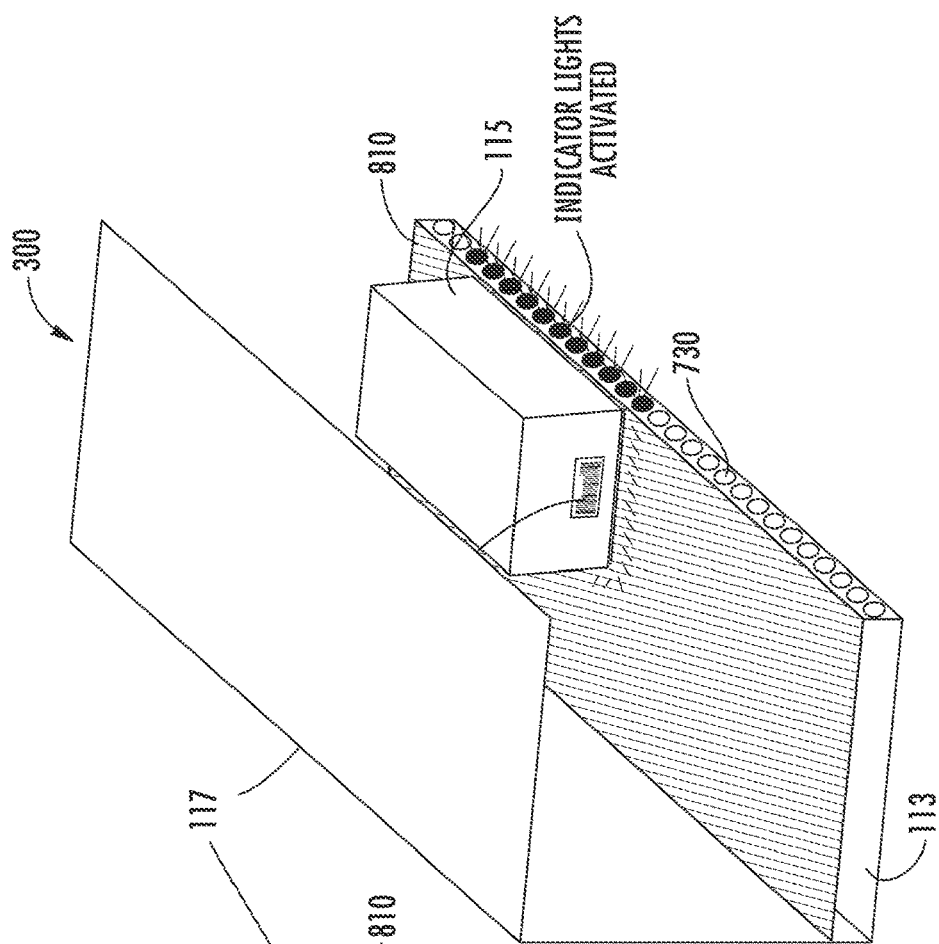
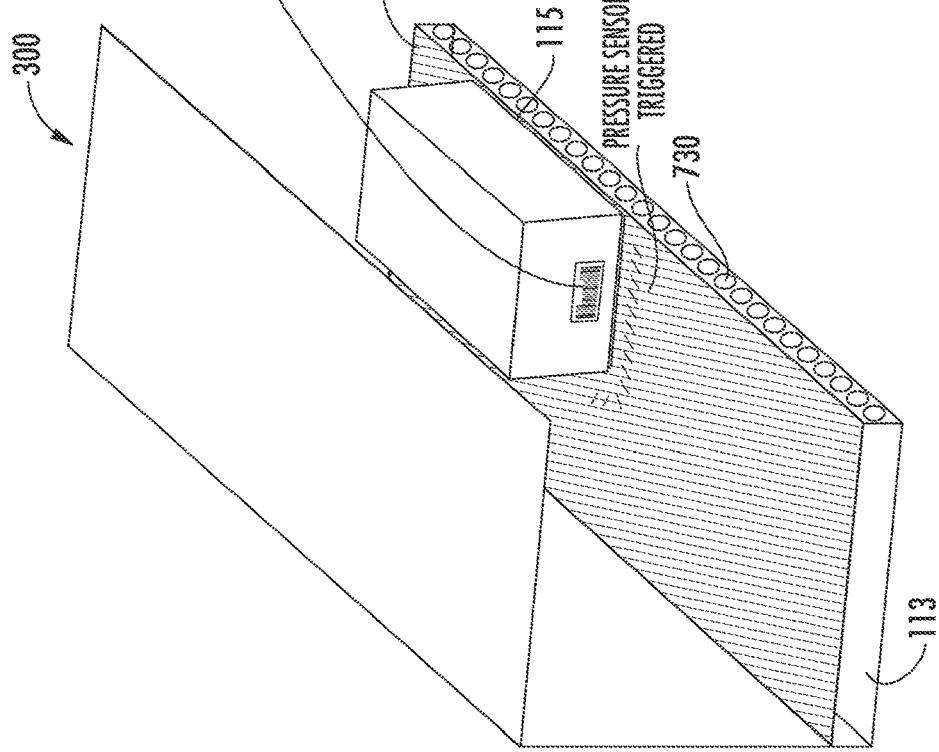

IN-VEHICLE PACKAGE LOCATION IDENTIFICATION AT LOAD AND DELIVERY TIMES

FIELD OF THE INVENTION

Embodiments of the present invention relate to the field of package and/or parcel delivery and, more specifically, to apparatuses, methods, and systems for locating packages in delivery vehicles at load and delivery times.

BACKGROUND

In package delivery, package sizes will generally vary. When packages are loaded into a delivery vehicle, they are usually loaded onto shelves in a somewhat random order. Typically, the driver of the delivery vehicle is not the person responsible for loading the packages into the vehicle and staging the packages. As such, while the driver may know the general location of a particular package in the vehicle, the driver may still have to spend a significant amount of time searching for the specific package to be delivered at a particular delivery location.

Therefore a need exists for systems that register the locations of packages in a delivery vehicle at load time and systems that locate those packages in the vehicle at delivery time.

SUMMARY

Accordingly, one aspect of the present invention discloses a delivery vehicle package locating system, the system comprising: one or more shelves for storing a plurality of packages, wherein each shelf comprises: a shelf communication interface; a plurality of indicator lights in a row; a plurality of emitting lights in a row along a first edge of the shelf; a plurality of light sensors in a row on a second edge of the shelf, wherein each light sensor on the second edge of the shelf corresponds to an emitting light on the first edge of the shelf; a shelf control system communicatively coupled to the shelf communication interface, plurality of indicator lights, plurality of emitting lights, and plurality of light sensors, and comprising a shelf processor and a shelf memory storing program codes wherein the shelf is operable to: determine the width and shelf-location of a package loaded on a shelf; and send the width and shelf-location information for the package to a computer system; and the computer system comprising: a computer communication interface; a computer control system communicatively coupled to the computer communication interface and comprising a computer processor and a computer memory storing program codes wherein the computer is operable to: receive delivery-location information for the package; receive package identification information for the package; receive width and shelf-location information for the package; and correlate and store the delivery-location information, the package identification information, and the width and shelf-location information for the package.

In other embodiments, the computer system is further operable to: determine vehicle-location information for the current location of the delivery vehicle; and responsive to the vehicle-location information corresponding with delivery-location information, send the corresponding shelf-location information for the package to the one or more shelves; and each of the one or more shelves is further operable to: receive shelf-location information from the computer system for the package; and activate the indicator lights corresponding to the width and shelf-location of the package to be delivered.

In further embodiments, the indicator lights are light emitting diodes (LEDs).

In still further embodiments, the emitting lights are infrared emitting LEDs.

In more embodiments, the light sensors detect light from infrared LEDs.

In separate embodiments, activating the indicator lights comprises causing the indicator lights to blink.

In still additional embodiments, activating the indicator lights comprises causing the indicator lights to light up.

A further aspect of the present invention describes a system comprising: one or more shelves for storing a plurality of packages, wherein each shelf comprises: a shelf communication interface; a plurality of indicator lights in a row; a pressure sensor associated with the surface area of the shelf; a shelf control system communicatively coupled to the shelf communication interface, plurality of indicator lights and the pressure sensor and comprising a shelf processor and a shelf memory storing program codes wherein the shelf is operable to: determine the width and shelf-location of a package loaded on a shelf; and send the width and shelf-location information for the package to a computer system; and the computer system comprising: a computer communication interface; a computer control system communicatively coupled to the computer communication interface and comprising a computer processor and a computer memory storing program codes wherein the computer is operable to: receive delivery-location information for the package; receive package identification information for the package; receive width and shelf-location information for the package; and correlate and store the delivery-location information, the package identification information, and the width and shelf-location information for the package.

In other embodiments, the computer system is further operable to: receive a request for the available space in the delivery vehicle; send a request to each of the one or more shelves for the available shelf space on each of the one or more shelves; receive the available shelf space from each of the one or more shelves; aggregate the available shelf space from each of the one or more shelves to create the available shelf space in the delivery vehicle; and report the available shelf space in the delivery vehicle to a dashboard; and each of the one or more shelves is further operable to: receive a request for the available shelf space from the computer system; and send the available shelf space to the computer system.

In additional embodiments, the one or more shelves comprise one or more floor areas of the delivery vehicle.

In expanded embodiments, the request for available shelf space in the delivery vehicle is received from the computer system.

In extended embodiments, the dashboard is displayed on the computer system.

In another embodiment, the request for available shelf space in the delivery vehicle is received from a computer system associated with a dispatcher.

In yet further embodiments, the dashboard is displayed on the computer system associated with a dispatcher.

In more embodiments, each shelf further comprises grid lights.

And in additional embodiments, the computer system is further operable to: determine vehicle-location information for the current location of the delivery vehicle; and responsive to the vehicle-location information corresponding with delivery-location information, send the corresponding shelf-location information for the package to the one or more shelves; and each of the one or more shelves is further operable to: receive shelf-location information from the computer system for the package; and activate the grid lights corresponding to the shelf-location of the package to be delivered.

And yet a further aspect of the present invention imparts system comprising: one or more shelves for storing a plurality of packages; one or light pointers, wherein each light pointer comprises: a light pointer communication interface; a light source; a light pointer control system communicatively coupled to the light pointer communication interface and the light source and comprising a light pointer processor and a light pointer memory storing program codes wherein the light pointer is operable to: identify a shelf-location for a package, wherein the shelf-location is identified using a light spot generated by the light source; and send the shelf-location information for the package to a computer system; and the computer system comprising: a computer communication interface; a computer control system communicatively coupled to the computer communication interface and comprising a computer processor and a computer memory storing program codes wherein the computer is operable to: receive delivery-location information for the package; receive package identification information for the package; receive shelf-location information for the package; and correlate and store the delivery-location information, the package identification information, and the shelf-location information for the package.

In further embodiments, the computer system is further operable to: determine vehicle-location information for the current location of the delivery vehicle; and responsive to the vehicle-location information corresponding with delivery-location information, send the corresponding shelf-location information for the package to the one or more shelves; and each of the one or more light pointers is further operable to: receive shelf-location information from the computer system for the package; and identify the shelf-location of the package to be delivered, wherein the shelf-location is identified using a light spot generated by the light source.

In additional embodiments, the light source is adjustable.

And in yet further embodiments, the light pointer comprises a plurality of light sources.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 8A through 8D are diagrams of an intelligent shelf system for the delivery vehicle package locating system according to another embodiment of the present invention.

DETAILED DESCRIPTION

Embodiments of the present invention relate to shelving and package locating systems for delivery vehicles (e.g., delivery trucks). In particular, embodiments of the present invention describe an improved system for delivery vehicles that registers the locations of packages in the vehicle at load time and then locates those packages in the vehicle at delivery time.

In one embodiment of the present invention, the location of packages are registered at load time using an indicia associated with the location on a shelf in the delivery vehicle. In other embodiments of the present invention, the locations of packages are registered at load time using light sensors on the shelf. In another embodiment of the present invention, the locations of packages are registered at load time using pressure sensors on the shelf. In an alternative embodiment, the pressure sensors are on the floor of the delivery vehicle and the locations of the packages are recorded based on the location of the delivery driver or sorter who is loading the vehicle. In yet another embodiment of the present invention, the location of packages is registered at load time using a light spot.

In one embodiment of the present invention, packages are identified at the time of delivery using variable length light indicators. In other embodiments of the present invention, packages are identified at the time of delivery using a light spot.

Figure 1:
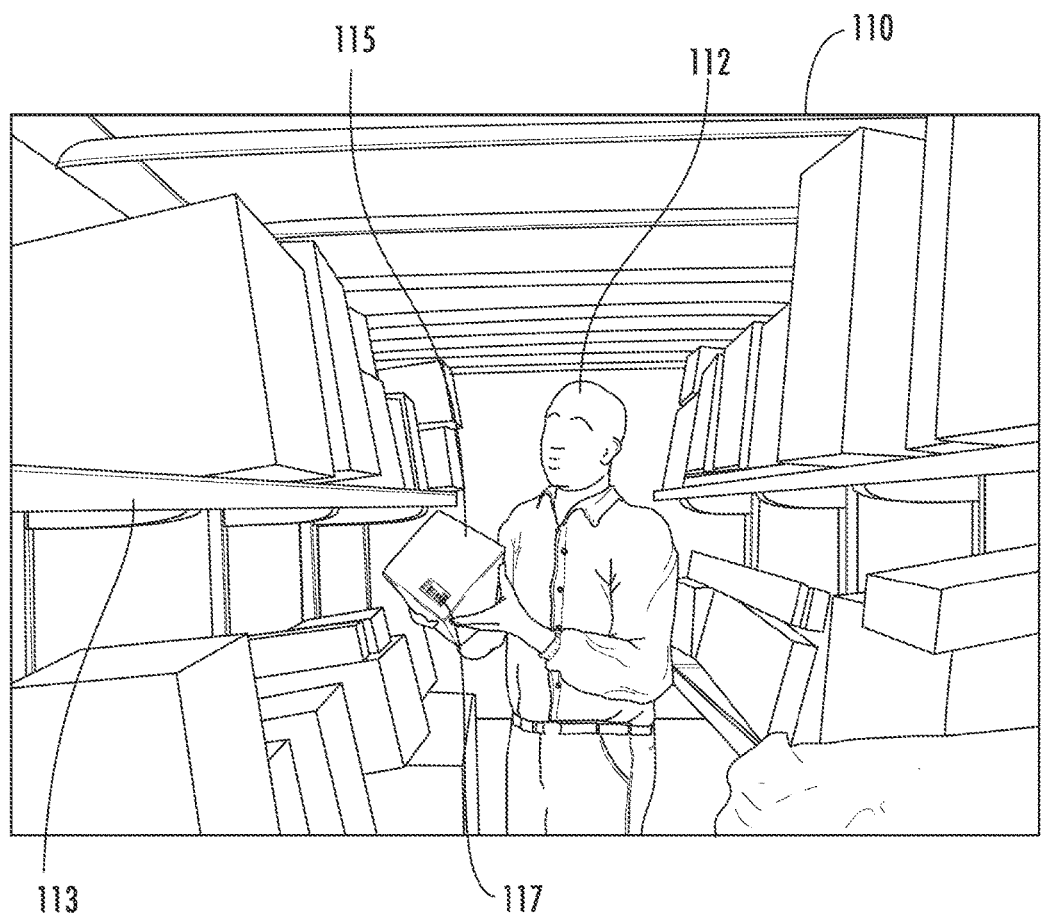
FIG. 1 depicts a general delivery vehicle for the delivery vehicle package locating system according to embodiments of the present invention.

FIG. 1 depicts a general delivery vehicle 110 for the delivery vehicle package locating system according to embodiments of the present invention. Typical delivery vehicles 110 that may employ shelving systems according to embodiments of the present invention include, without limitation, panel-van delivery vehicles such as the kind used by commercial parcel carriers (e.g., UPS, FedEx, and DHL Express). References in the disclosure to particular kinds of vehicles are not intended to limit the disclosure to any kind of particular vehicle or container that may be used to ship or otherwise deliver packages 115 (e.g., vans, box trucks, semi-trailers, etc.). The packages 115 are generally loaded in the vehicle 110 by a sorter or the delivery driver 112. Each package generally has an associated indicia 117 which uniquely identifies the package. Packaged indicia may have additional information about the package associated with it, beyond just identification information.

Further, although shelving systems are referred to herein, the term "shelving" is used in a general sense and is not limited simply to the shelving rows that may typically be used within panel-van type delivery vehicles. Those having skill in the art will recognize that the system of the present invention may be used with any kind of unit that may be used in shipping (e.g., cargo containers, stacking bins, shelf bins, straight-wall containers, stack and nest containers, divided boxes, etc.).

In sum, an exemplary system according to embodiments of the present invention may include one or more shelves 113 for storing packages 115 within a delivery vehicle 110 (e.g., as the packages 115 are in transit during delivery). Typically, each package 115 is associated with both a geographic address for delivery (i.e., delivery-location information) and an assigned location on a particular shelf within the delivery vehicle (i.e., shelf-location information). The system includes a GPS unit 290 for detecting or otherwise determining the location of the delivery vehicle 110 during delivery (e.g., while the driver of a delivery vehicle 110 is driving a predetermined delivery route). The system further includes a computer 220 (e.g., a central processing unit 225 and an associated memory 230) that is configured to provide the shelf location of a particular package 115 (i.e., the shelf location information) to a delivery driver when that package's delivery-location information is within a specified range of the vehicle location (i.e., when the delivery vehicle is close to the delivery stop).

Figure 2:
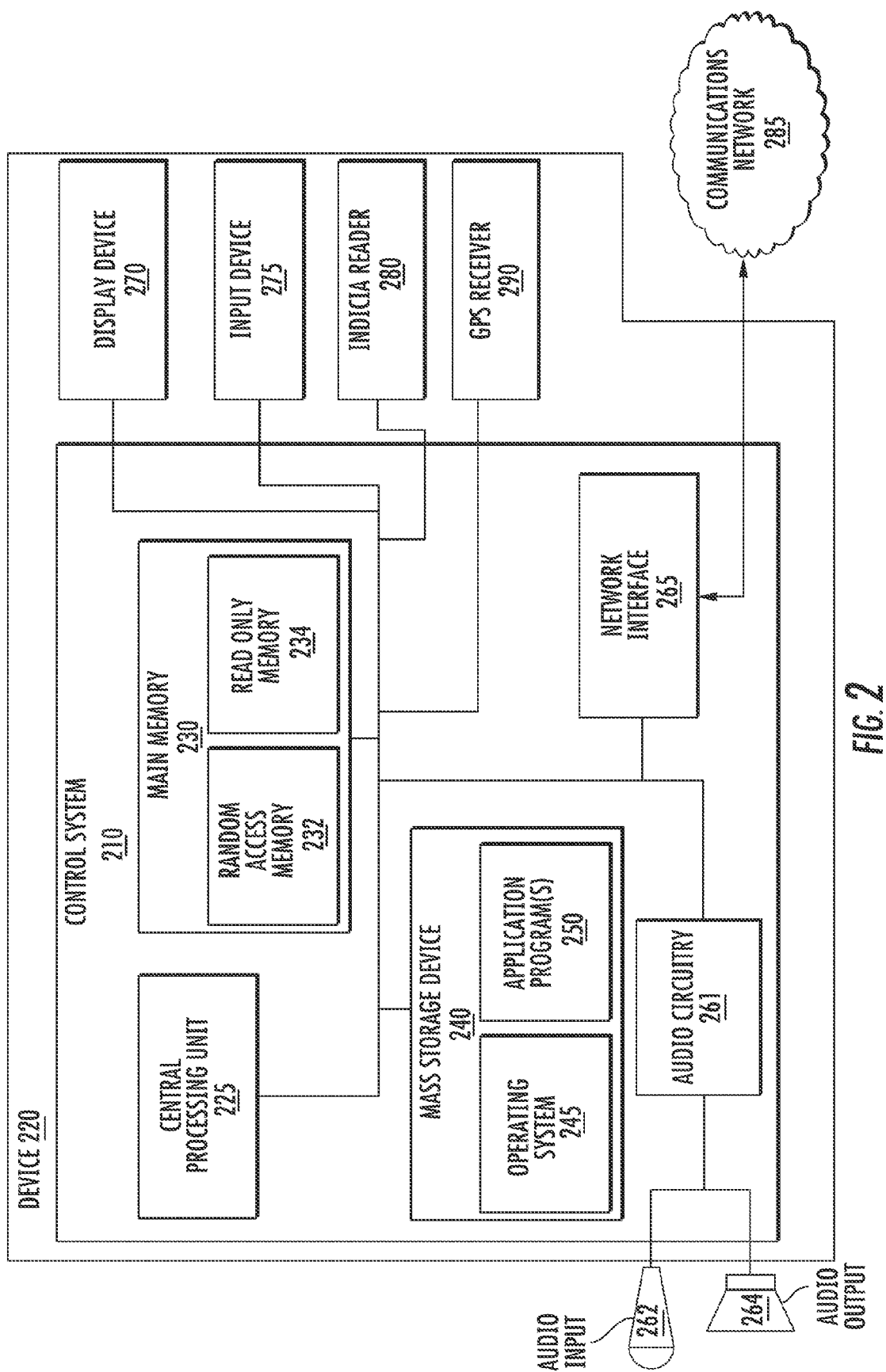
FIG. 2 is a schematic block diagram illustrating components of a device used in the delivery vehicle package locating system according to embodiments of the present invention.

FIG. 2 is a schematic block diagram illustrating components of a device used in the delivery vehicle package locating system according to embodiments of the present invention. The device 220 may include other components not shown in FIG. 2, nor further discussed herein for the sake of brevity. One having ordinary skill in the art will understand the additional hardware and software included but not shown in FIG. 2. In general, the device 220 of FIG. 2 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, and other similar computing devices.

For example, a mobile computer (i.e., a computer within a hand-supportable housing) including components of the device 220 (e.g., a computer, indicia-reading device, and GPS receiver) may be used. The mobile computer equipped with the various components may be a mobile phone (i.e., a smart phone), a tablet, a wearable computer (e.g., a wrist wearable computer, head mounted computer, etc.), or any similar portable electronic device. Similarly, a vehicle-mount computer in operative communication with components that are separate fixtures within the delivery vehicle 110 (e.g., fixed displays, audio indicators, etc.) may be used.

In some embodiments, the device 220 acts as the primary computing device for the delivery vehicle 110, such as a computer that is built into the delivery vehicle 110 or a laptop that is used by the operator of the delivery vehicle 110.

In particular, FIG. 2 depicts a device 220 that includes a control system 210 comprising a mass storage device 240 for storing an operating system 245 and various application programs 250. The mass storage device 240 may store other kinds of information as well.

The operating system 245 includes software that controls the overall operation of the device 220, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, the operating system 245 is loaded by booting the device 220 and is executed directly by the central processing unit 225.

Application programs 250 include any number of executable software programs designed to assist the delivery driver in the performance of specific tasks. Application programs 250 may load automatically upon execution of the operating system 245 or in response to an input from the operator through the input device 275. Such application programs 250 may include voice based applications that allow the device 220 to either audibly read instructions to or take voice commands from the delivery driver or sorter 112 using audio circuitry 261 and audio input component 262, such as a microphone, and audio output component 262, such as a speaker.

Main memory 230 provides for the storage of instructions and information directly accessible by central processing unit 225. Main memory 230 may be configured to include random-access memory 232 (RAM) and read-only memory 234 (ROM). The ROM 234 may permanently store firmware or a basic input/output system (BIOS), which provides first instructions to the device 220 when it is booted. RAM 232 may serve as temporary and immediately accessible storage for the operating system 245 and the application programs 250.

Mass storage device 240 may be any of the various kinds of computer components capable of storing large amounts of data in a persisting (i.e., non-volatile) and machine-readable manner. Mass storage device 240 may be a hard disk, a solid state drive, optical drive, removable flash drive, self-encrypting drive or any other component with similar storage capabilities.

A display device 270 may be operably connected to the device 220. The display device 270 may display information to the user in the form of text or graphical output generated by device 220. Typically, the display device 270 is a liquid crystal display (LCD) screen.

An input device 275 is operably connected to the device 220. The input device 275 facilitates the input of instructions or information by the operator. The input device 275 may be a keyboard and/or a mouse or some other input devices such as a touch screen.

An indicia reader 280 (e.g., a laser scanner, image code reader, barcode reader, RFID reader, etc.) is also operably connected to the device 220 (e.g., via a wireless connection or a wired/corded connection). The indicia reader 280 facilitates the receipt of input and provides for quick, reliable data entry that is not susceptible to typographical errors.

The term indicia as used herein is intended to refer broadly to various kinds of machine-readable indicia, including barcodes, Quick Response (QR) codes, matrix codes, 1D codes, 2D codes, Radio Frequency Identification (RFID) tags, characters, Near-Field Communication (NFC) tags, Bluetooth ID, etc. The indicia are typically graphical representations of information (e.g., data) such as product numbers or package tracking numbers.

The device 220 also includes a network interface 265. The network interface 265 is logically connected to a communications network 285, thereby enabling the device 220 to communicate with the communications network 285. The communications network 285 may be any collection of computers or communication devices interconnected by communication channels. The communication channels may be wired or wireless. Examples of such communication networks include, without limitation, local area networks, the Internet, and cellular networks. The connection to the communications network 285 allows the device 220 to communicate with other network nodes. For example, a central dispatcher can send instructions (e.g., a delivery schedule for items) from a scheduling server to a delivery driver's device 220 via the communications network 285.

GPS receiver 290 utilizes signals broadcast from satellites to make calculations regarding latitude and longitude. The GPS receiver provides the latitude and longitude information to the central processing unit 225, which is responsible for the processing and storage of the information.

In one embodiment, the device 220 may alert the driver as to the correct shelf location by way of display device 270. The device 220 may also incorporate audible indicators to indicate the location of the correct package for the current delivery stop.

Figure 3:
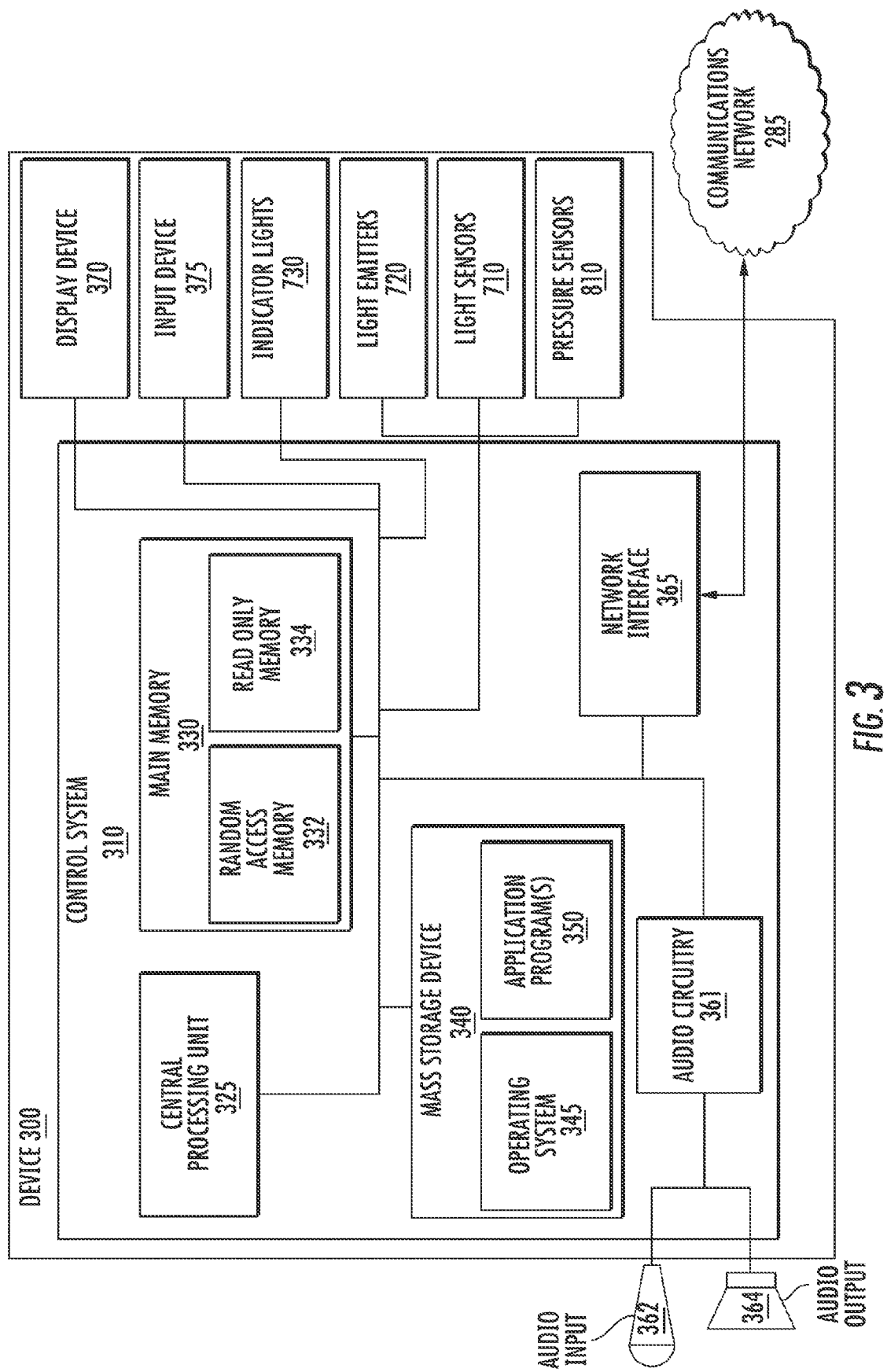
FIG. 3 is a schematic block diagram illustrating components of a device used in the delivery vehicle package locating system according to embodiments of the present invention.

FIG. 3 is a schematic block diagram illustrating components of a device used in the delivery vehicle package locating system according to embodiments of the present invention. The device 300 may include other components not shown in FIG. 3, nor further discussed herein for the sake of brevity. One having ordinary skill in the art will understand the additional hardware and software included but not shown in FIG. 3. In some embodiments, the device 300 of FIG. 3 is a controller associated with a shelf 113 to form an intelligent shelf system according to embodiments of the present invention. For convenience, the intelligent shelf system will sometimes be referred to as the intelligent shelf system 300, indicating the combination of the shelf 113 with the device 300. In practice, the device 300 could be built into the shelf 113 or could be located separate from the shelf 113 or some other configuration.

In particular, FIG. 3 depicts a device 300 that includes a control system 310 comprising a mass storage device 340 for storing an operating system 345 and various application programs 350. The mass storage device 340 may store other kinds of information as well.

The operating system 345 includes software that controls the overall operation of the device 300, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, the operating system 345 is loaded by booting the device 300 and is executed directly by the central processing unit 325.

Application programs 350 include any number of executable software programs designed to assist the delivery driver in the performance of specific tasks. Application programs 350 may load automatically upon execution of the operating system 345 or in response to an input from the operator through the input device 375.

Main memory 330 provides for the storage of instructions and information directly accessible by central processing unit 325. Main memory 330 may be configured to include random-access memory 332 (RAM) and read-only memory 334 (ROM). The ROM 334 may permanently store firmware or a basic input/output system (BIOS), which provides first instructions to the device 330 when it is booted. RAM 332 may serve as temporary and immediately accessible storage for the operating system 345 and the application programs 350.

Mass storage device 340 may be any of the various kinds of computer components capable of storing large amounts of data in a persisting (i.e., non-volatile) and machine-readable manner. Mass storage device 340 may be a hard disk, a solid state drive, optical drive, removable flash drive, self-encrypting drive or any other component with similar storage capabilities.

In some embodiments, the device 300 also has audio circuitry 361 for an audio input component 362, such as a microphone, and an audio output component 362, such as a speaker to interact with voice-based applications 350.

In some embodiments, a display device 370 may be operably connected to the device 300. The display device 370 may display information to the user in the form of text or graphical output generated by device 300. In some embodiments, the display device 370 is a liquid crystal display (LCD) screen. In other embodiments, the display device is an electronic ink (E-ink) display).

Also in some embodiments, an input device 375 is operably connected to the device 300. The input device 375 facilitates the input of instructions or information by the operator. The input device 375 may be a keypad, trackpad, and/or some other input devices such as a touch screen.

In some embodiments, device 300 includes light emitters 720, such as infrared emitting light emitting diodes (LEDs), light sensors 710, such as infrared light sensors, and indicator lights 730, such as LEDs. In other embodiments, device 300 includes a pressure sensor 810, such as a pressure sensitive mat.

The device 300 also includes a network interface 365. The network interface 365 is logically connected to a communications network 285, thereby enabling the device 300 to communicate with the communications network 285. The communications network 285 may be any collection of computers or communication devices interconnected by communication channels. The communication channels may be wired or wireless. Examples of such communication networks include, without limitation, local area networks, the Internet, and cellular networks. The connection to the communications network 285 allows the device 300 to communicate with other network nodes. For example, intelligent shelf system 300 can exchange information with the central computer device 220 in the delivery vehicle 110.

Figure 4:
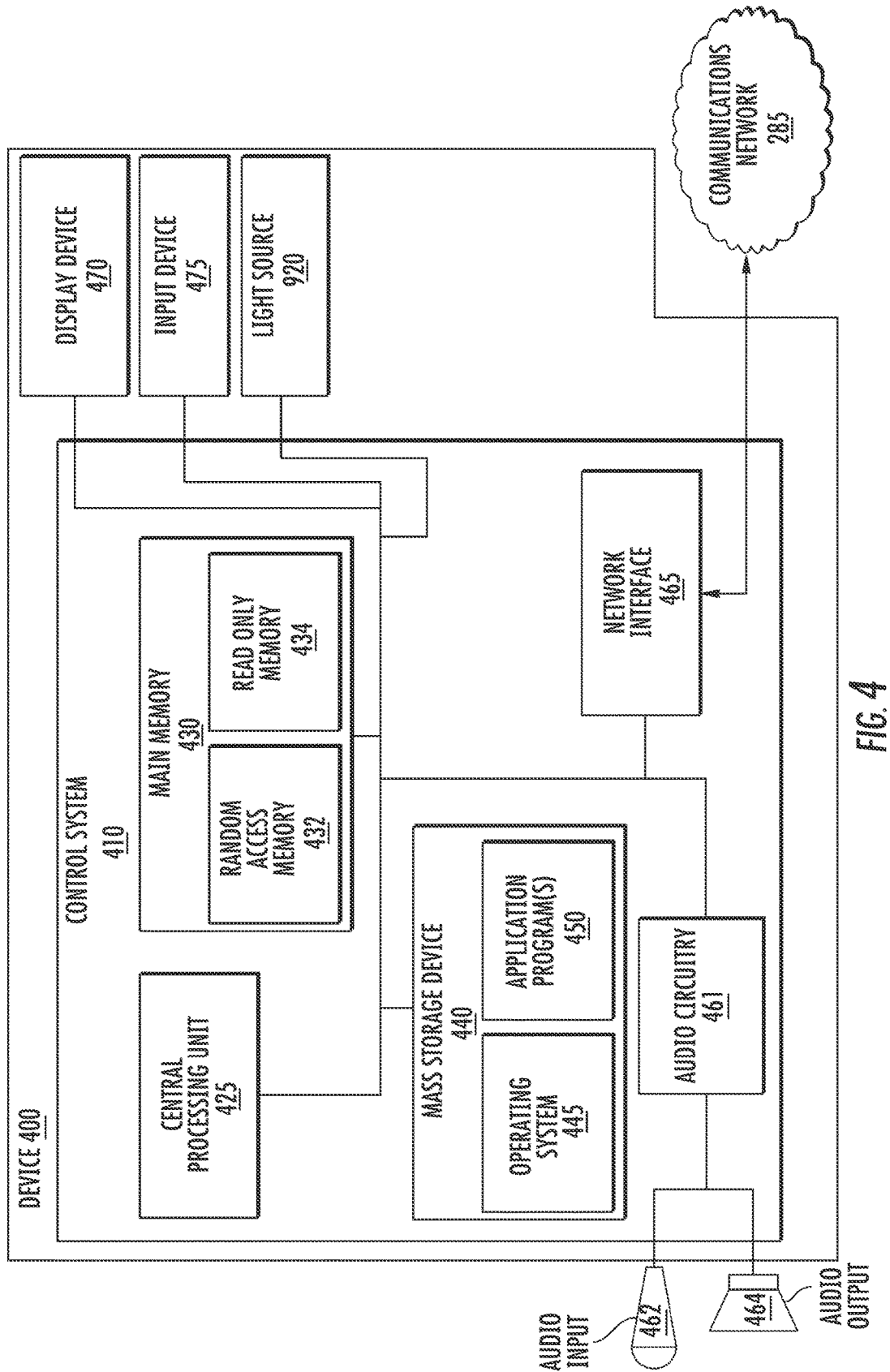
FIG. 4 is a schematic block diagram illustrating components of a device used in the delivery vehicle package locating system according to embodiments of the present invention.

FIG. 4 is a schematic block diagram illustrating components of a device used in the delivery vehicle package locating system according to embodiments of the present invention. The device 400 may include other components not shown in FIG. 4, nor further discussed herein for the sake of brevity. One having ordinary skill in the art will understand the additional hardware and software included but not shown in FIG. 4. In some embodiments, the device 400 of FIG. 4 is a controller associated with a light pointer device 910, such as a 360 degree light pointer. In some embodiments, the light pointer 910 contains many light sources 920 that are able to generate a beam of light at a targeted location, light spot 930. In other embodiments, the light pointer 910 contains a single light source 920 that may be directed so as to generate a light spot 930. For convenience, the light pointer device 910 will sometimes be referred to as the intelligent pointer system 400, indicating the combination of the light pointer 910 with the device 400.

In practice, the device 400 could be built into the light pointer device 910 or could be located separate from the light pointer device 910 or some other configuration.

In particular, FIG. 4 depicts a device 400 that includes a control system 410 comprising a mass storage device 440 for storing an operating system 445 and various application programs 450. The mass storage device 440 may store other kinds of information as well.

The operating system 445 includes software that controls the overall operation of the device 400, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, the operating system 445 is loaded by booting the device 400 and is executed directly by the central processing unit 425.

Application programs 450 include any number of executable software programs designed to assist the delivery driver in the performance of specific tasks. Application programs 450 may load automatically upon execution of the operating system 445 or in response to an input from the operator through the input device 475.

Main memory 430 provides for the storage of instructions and information directly accessible by central processing unit 425. Main memory 430 may be configured to include random-access memory 432 (RAM) and read-only memory 434 (ROM). The ROM 434 may permanently store firmware or a basic input/output system (BIOS), which provides first instructions to the device 430 when it is booted. RAM 432 may serve as temporary and immediately accessible storage for the operating system 445 and the application programs 450.

Mass storage device 440 may be any of the various kinds of computer components capable of storing large amounts of data in a persisting (i.e., non-volatile) and machine-readable manner. Mass storage device 440 may be a hard disk, a solid state drive, optical drive, removable flash drive, self-encrypting drive or any other component with similar storage capabilities.

In some embodiments, the device 400 also has audio circuitry 461 for an audio input component 462, such as a microphone, and an audio output component 462, such as a speaker to interact with voice-based applications 450.

In some embodiments, a display device 470 may be operably connected to the device 400. The display device 470 may display information to the user in the form of text or graphical output generated by device 400. Typically, the display device 470 is a liquid crystal display (LCD) screen.

Also in some embodiments, an input device 475 is operably connected to the device 400. The input device 475 facilitates the input of instructions or information by the operator. The input device 475 may be a keypad, trackpad, and/or some other input devices such as a touch screen.

In some embodiments, device 400 includes a light source 920 capable of generating a light spot 930.

The device 400 also includes a network interface 465. The network interface 465 is logically connected to a communications network 485, thereby enabling the device 400 to communicate with the communications network 285. The communications network 285 may be any collection of computers or communication devices interconnected by communication channels. The communication channels may be wired or wireless. Examples of such communication networks include, without limitation, local area networks, the Internet, and cellular networks. The connection to the communications network 285 allows the device 400 to communicate with other network nodes. For example, intelligent pointer system 400 can exchange information with the central computer device 220 in the delivery vehicle 110.

Figure 5B:
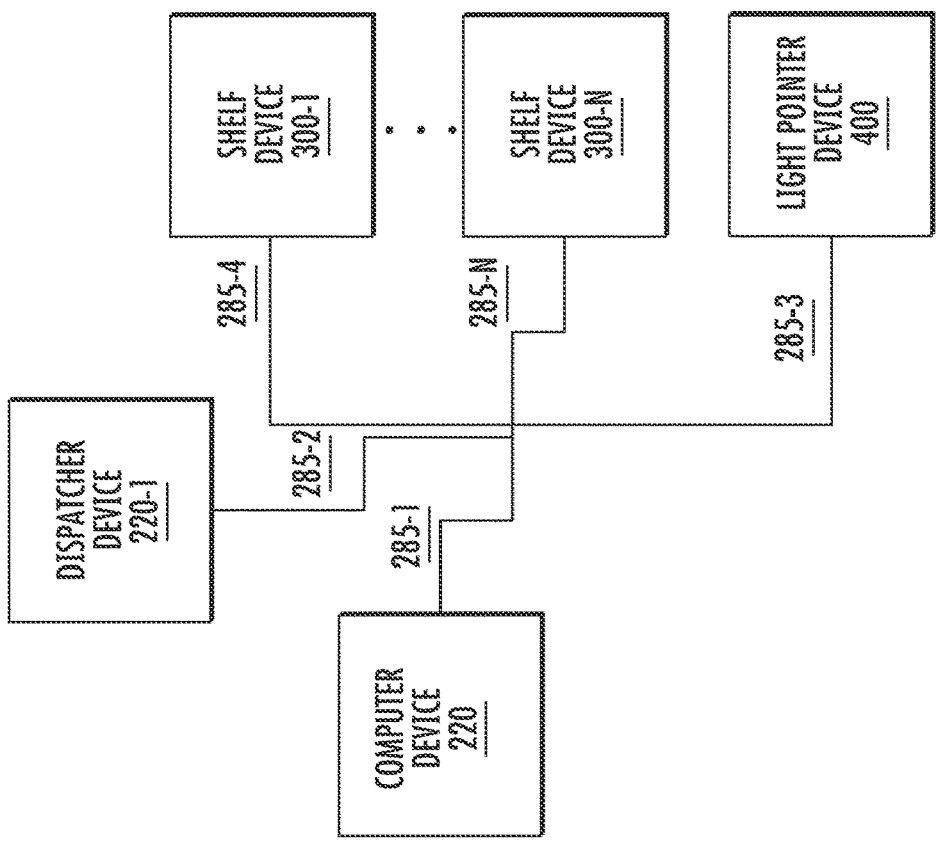
FIG. 5A and FIG. 5B are connectivity diagrams for the devices in the delivery vehicle package locating system according to embodiments of the present invention.
Figure 5A:
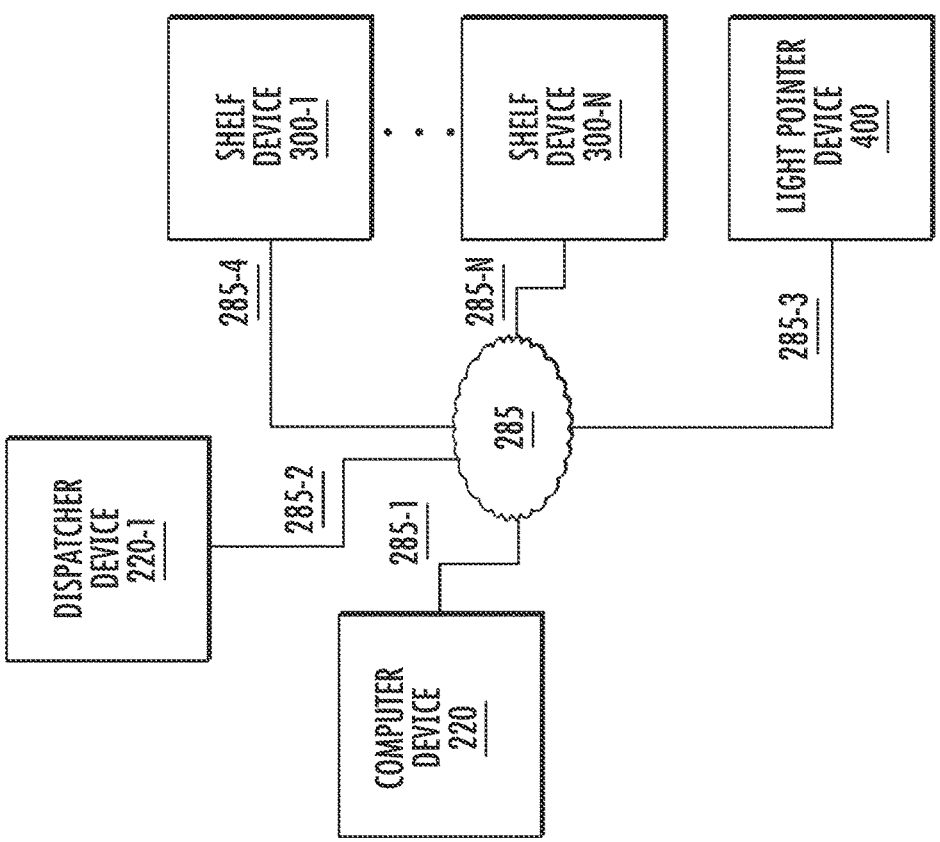

FIG. 5A and FIG. 5B are connectivity diagrams for the devices in the delivery vehicle package locating system according to embodiments of the present invention.

FIG. 5A illustrations one embodiment in which a computer device 220, such as the primary computer in the delivery vehicle 110, is connected to one or more intelligent shelf systems, denoted 300-1 to 300-N, over a network 285. The network 285 could be a local area network (LAN) or wide area network (WAN) such as the Internet. Network connections are made over data links 285-1 (to computer device 220) and 285-4 through 285-N (to intelligent shelf systems 300-1 through 300-N respectively). In other embodiments, the computer device 220 is connected to an intelligent pointer system 400 again through the network 285, as indicated by data link 285-3. While FIG. 5A illustrates only one intelligent pointer system 400, other embodiments may contain additional such systems. In some embodiments, the computer device 220 is connected to a dispatcher device, which may be similar in hardware and software to computer device 220 and hence designated 220-1, over the network 285 as indicated by data link 285-2.

FIG. 5B illustrates another embodiment in which the computer device 220 is connected to one or more intelligent shelf systems 300-1 to 300-N. In this case, the devices are directly connected as shown by data links 285-1, 285-4, and 285-N. Such direct links may be a serial data connection (such as RS232), universal serial bus (USB), or direct wireless connections (such as Wi-Fi Direct® or Bluetooth®). In other embodiments, the computer device 220 is again directly connected to an intelligent pointer system 400, as indicated by data link 285-2. While FIG. 5B illustrates only one intelligent pointer system 400, other embodiments may contain additional such systems. In some embodiments, the computer device 220 is also connected to a dispatcher device 220-1 as indicated by data link 285-2.

Figure 6A:
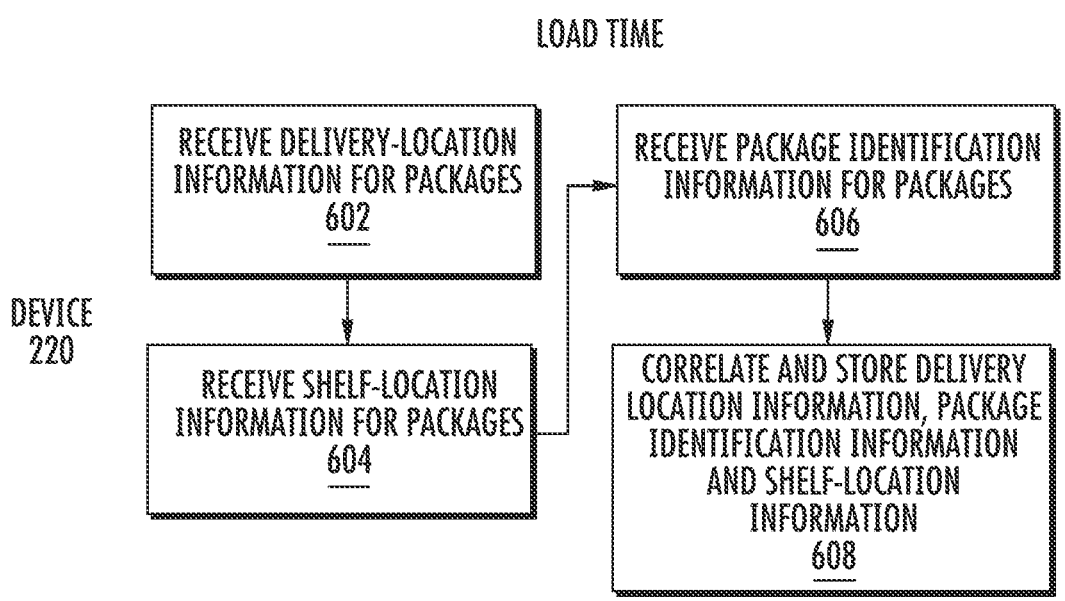
FIG. 6A through 6E are flow charts illustrating the operation of certain elements the delivery vehicle package locating system according to embodiments of the present invention.
Figures 6B, 6C:
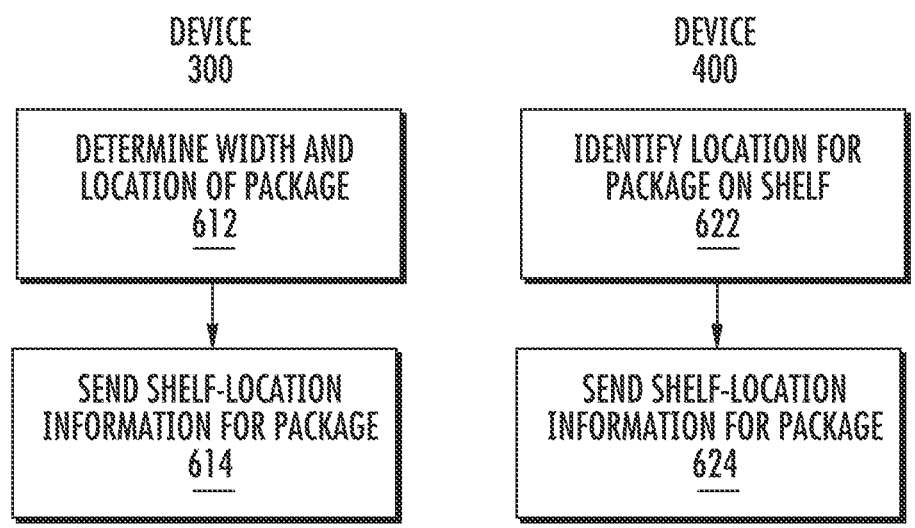

FIG. 6A through 6C are flow charts illustrating the operation of certain elements the delivery vehicle package locating system at load time according to embodiments of the present invention.

FIG. 6A is a flow chart depicting the operation of device 220 at load time in the delivery vehicle package locating system according to embodiments of the present invention. In Step 602, the computer device 220 receives delivery-location information for packages, such as from the central dispatcher for the delivery service. Then in Step 604, the computer device 220 receives shelf-location information for each package. Shelf-location information can be generated via several different methods according to embodiments of the present invention, as described below. Additionally, the device 220 receives package identification information for each package (Step 606) and correlates and stores (in the mass storage device 240 or elsewhere as appropriate) the package identification information, the delivery-location information, and shelf-location information for each package (Step 608). These steps may all be done at load time or at different times as appropriate.

In general, shelf-location information can be registered at load time using one of several ways.

In one embodiment, the delivery driver or sorter 112 scans an indicia 117 associated with the package (such as a barcode) via the indicia reader 280 and devices in the delivery vehicle 110 automatically determine the shelf-location for the package and communicate it to the computer device 220.

Figure 7A:
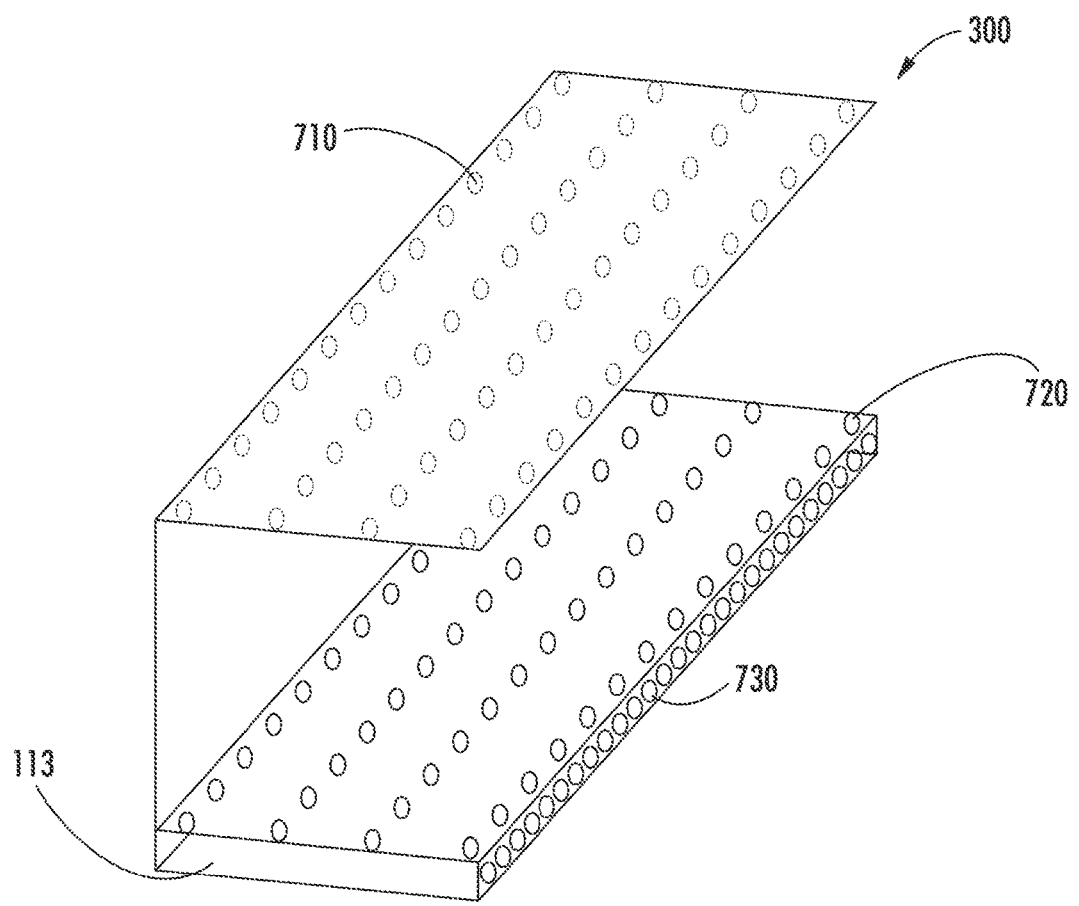
FIG. 7A through 7C are diagrams of an intelligent shelf system for the delivery vehicle package locating system according to one embodiment of the present invention.
Figure 7C:
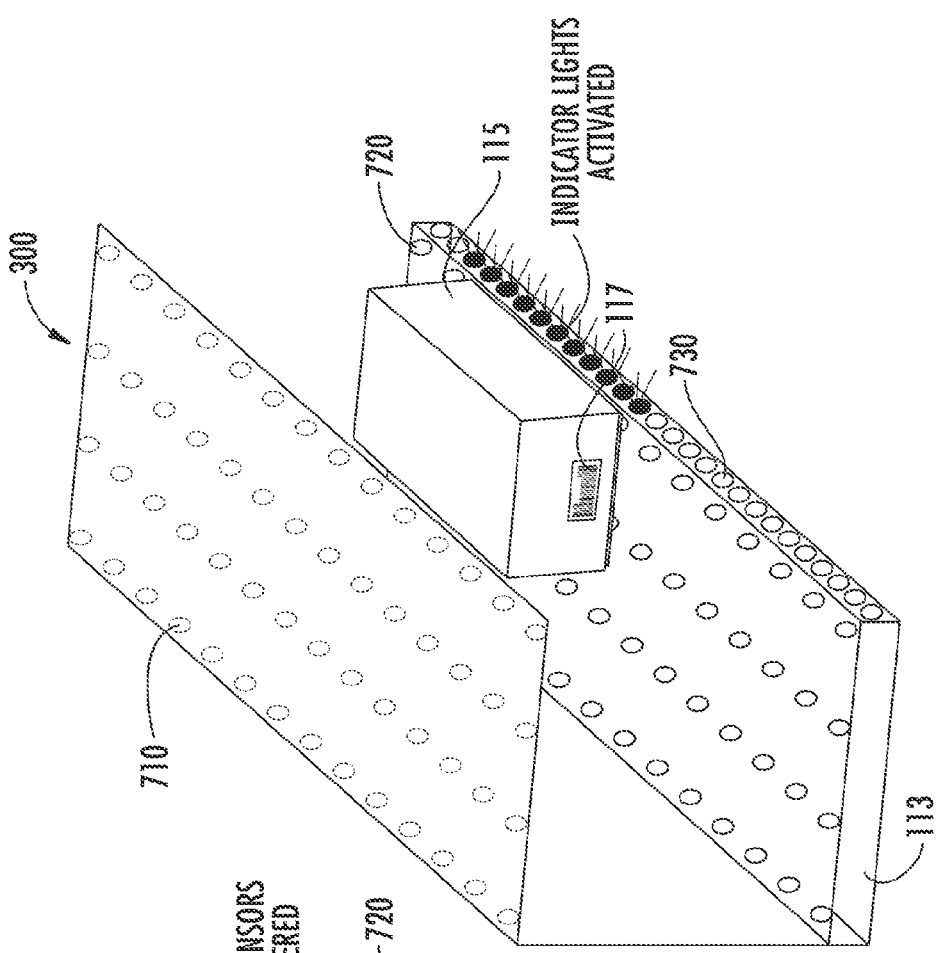
Figure 7B:
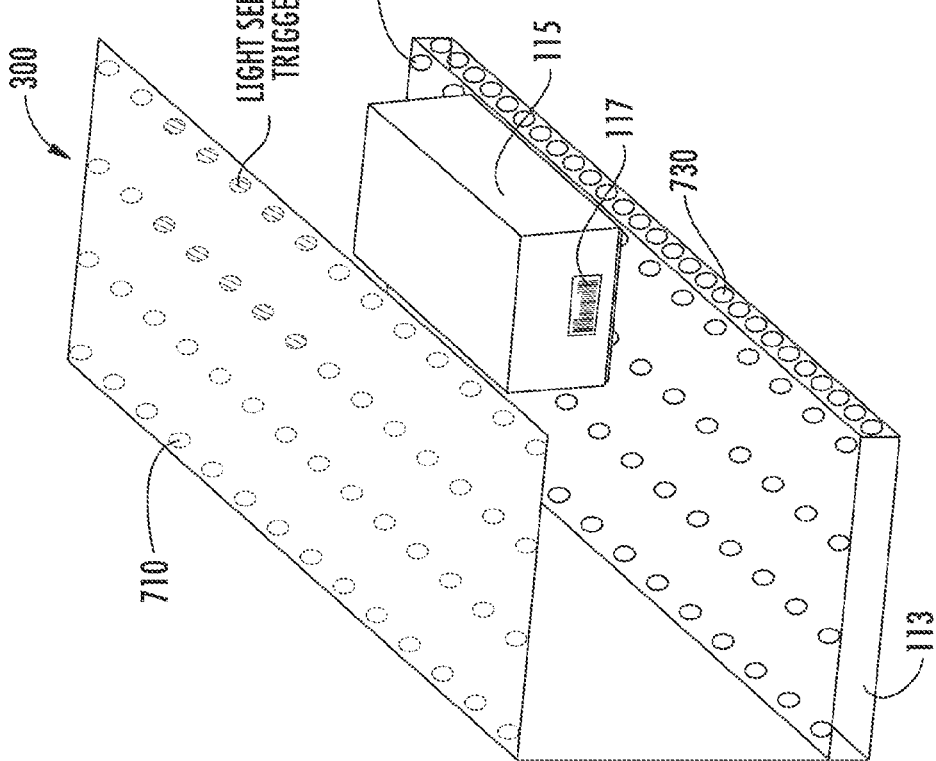

An example of this embodiment is captured in FIGS. 6B, 7A, and 7B. In this embodiment, the delivery driver or sorter 112 scans an indicia associated with the package 117 (such as a barcode) via the indicia reader 280 and then just puts the package on an intelligent shelf system 300 which automatically determines the shelf-location for the package and communicates it to the computer device 220.

FIG. 6B is a flow chart depicting the operation of the intelligent shelf system 300 at load time in the delivery vehicle package locating system according to embodiments of the present invention. In Step 612, the intelligent shelf system 300 detects the width and location of the package and then sends the shelf-location information for the package to the computer device 220 (Step 614).

FIG. 7A illustrates the intelligent shelf system 300 according to embodiments of the present invention. The intelligent shelf system 300 comprises a row of light emitters 720, such as infrared emitting light emitting diodes (LEDs), facing upward or downward (upward shown in FIG. 7A, 7B) at regular intervals along the edge of the shelf 113. The light emitters 720 will have a corresponding set of light sensors 710 on the opposite edge of the adjacent shelf at the same regular interval. The intelligent shelf system 300 also includes a row of indicator lights 730 facing outward from the shelf 113 spaced at small intervals. The interval spacing of the indicator lights 730 may be the same interval spacing as the emitter lights 720 and light sensors 710, or may be wider or narrower as required.

When a package 115 is placed on the intelligent shelf system 300, as shown in FIG. 7B, the package 115 blocks the infrared light from the light emitters 720 to the light sensors 710. In this manner, the intelligent shelf is able to detect the width and location of the package 115 (Step 612 in FIG. 6B). The network interface 365 of the intelligent shelf system then sends the width and location information for the package 115 to the computer device 220 (Step 614 in FIG. 6B).

Figure 8A:
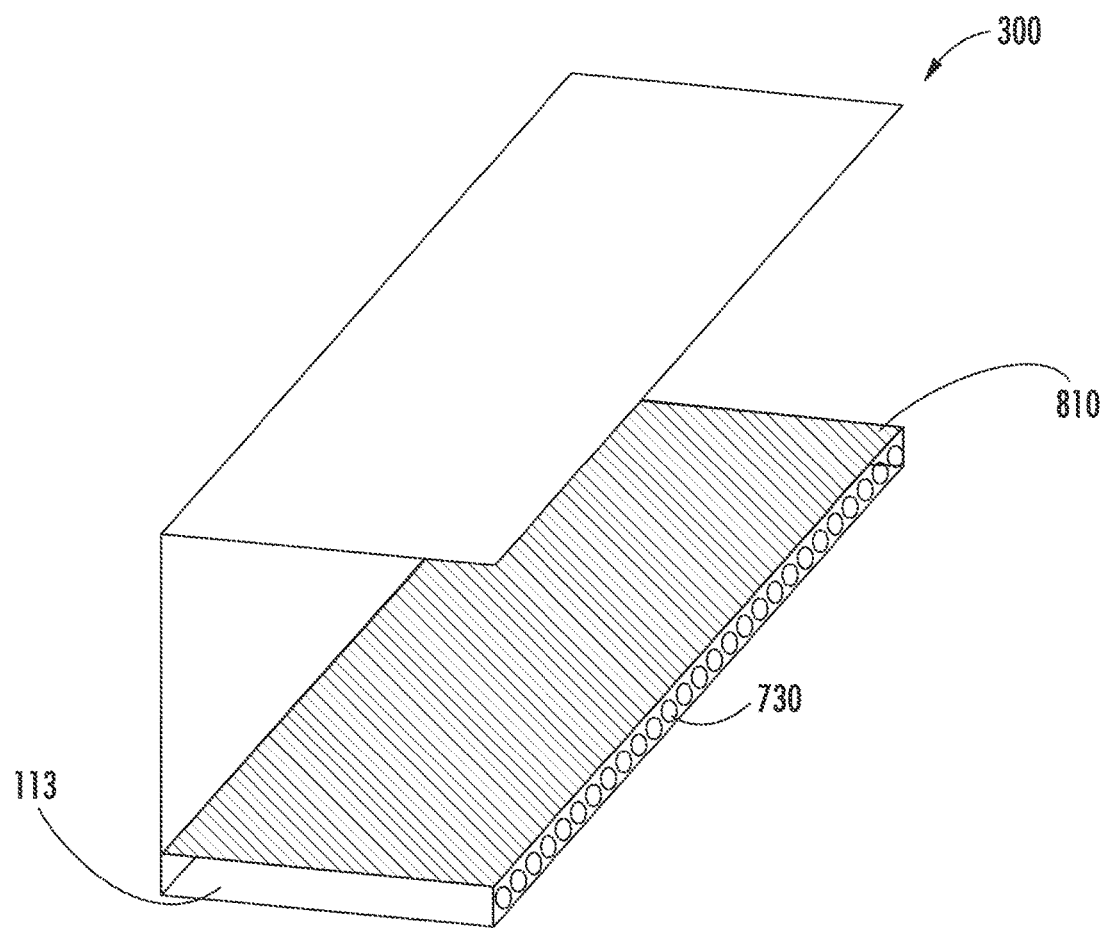

Another example of this embodiment is captured in FIGS. 6B, 8A, and 8B. FIG. 6B has already been discussed above and will not be repeated in the interest of brevity, since the flow chart is similar in this embodiment. FIG. 8A illustrates the intelligent shelf system 300 according to another embodiment of the present invention. The intelligent shelf system 300 comprises a pressure sensor 810 along the bottom shelf 113, such as a pressure sensitive mat. When a package is placed on the intelligent shelf system 300, as shown in FIG. 8B, the weight of the package 115 triggers the pressure sensor 810. In this manner, the intelligent shelf is able to detect the width and location of the package 115 (Step 612 in FIG. 6B). Again, the network interface 365 of the intelligent shelf system then sends the width and location information for the package 115 to the computer device 220 (Step 614 in FIG. 6B).

In alternative embodiments, the intelligent shelf system 300 takes the form of an intelligent floor system in which pressure sensors on the floor of the delivery vehicle 110 record the position of the delivery driver or sorter 112 when the package 115 is loaded. In this manner, the system is able to detect the location of the package.

Figure 8D:
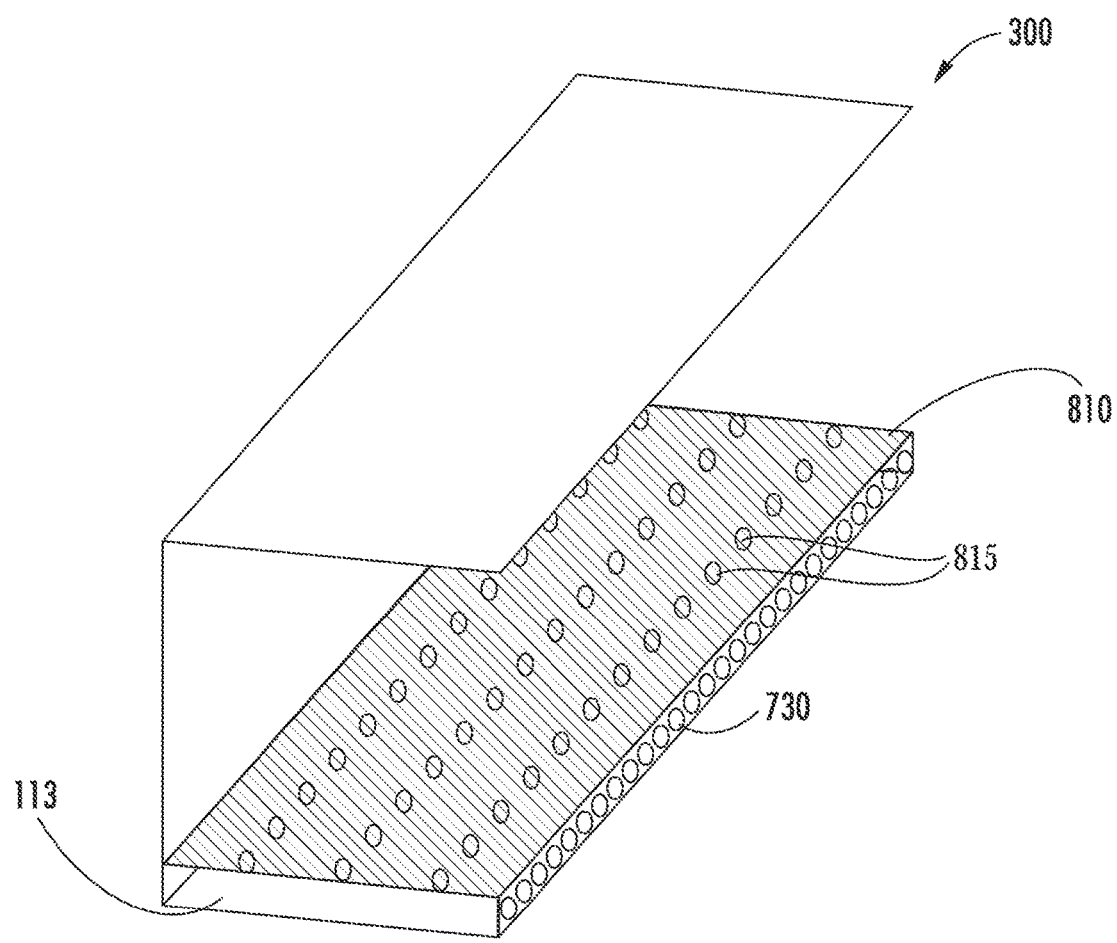

In other embodiments, the pressure sensors on the shelf or floor may be configured into a location matrix. The location matrix is configurable to match the size of available delivery vehicle space and/or size of packages and/or goods that will be transported by the vehicle. In some embodiments, the location matrix would be configurable so that groups of pressure points 815 in the pressure sensors 810 could be assigned to a location on the mat, as shown in FIG. 8D. Each package is labeled with an indicia 117, as discussed before, which can be a barcode, RFID tag, NFC tag, Bluetooth identifier, and the like. The indicia 117 are read by the indicia reader 280 associated with computer device 220 as packages are loaded onto the vehicle. The pressure sensors, either on the shelf and/or the floor are used to report the location of the package to the computer device 220. The location information and the package indicia are stored by computer device 220 for future use.

In some embodiments, available shelf space on the delivery vehicle can be reported to an automated dashboard for the driver or dispatcher to user to determine load planning for the vehicle. This automated dashboard may be implemented in software, hardware, or both and may reside in the computer device 220 on the vehicle, the dispatcher device 220-1, the intelligent shelf system 300 or any combination therein. The automated dashboard will also respond to on-demand queries to determine available space. Determining the amount of available shelf space involves querying each shelf or area in the vehicle that can hold packages and can report its available space and aggregating the available space for reporting to the dashboard. Knowledge and awareness of the amount of available space in a vehicle can be useful to the driver and/or dispatcher in making decisions on the number of packages that a driver could pick up during the day. It can also be useful to determine delivery vehicles should be employed for different types of package pickups.

In more embodiments, when the driver of the delivery vehicle has reached a destination for a delivery, the automated dashboard may also display the location of the package to be delivered in the vehicle. In some embodiments, the delivery vehicle may be equipped with grid lights that work with the automated dashboard to visually pinpoint the exact location of the package to be delivered.

Figure 9A:
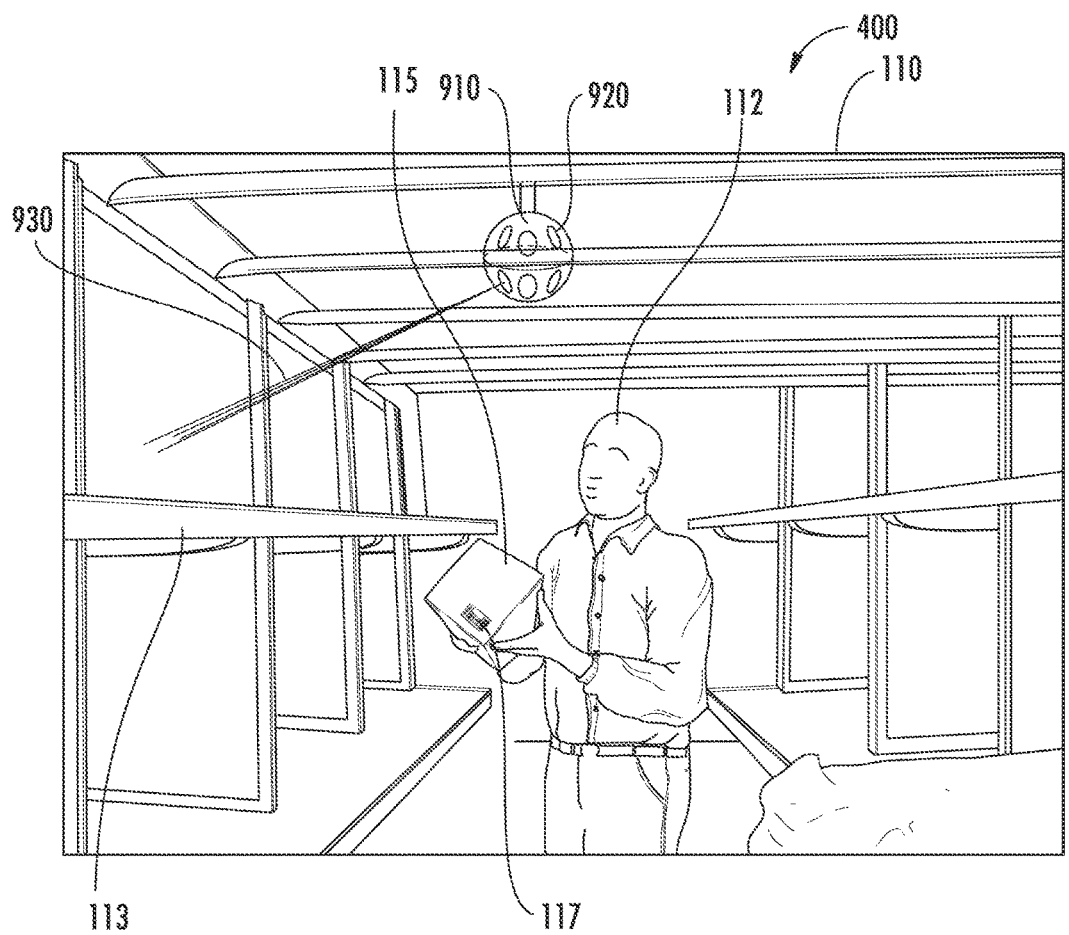
FIGS. 9A and 9B are diagrams of an intelligent pointer system according to yet another embodiment of the present invention.

Yet another embodiment describing how shelf-location information can be registered at load time is captured in FIGS. 6C and 9A. In this embodiment, the delivery driver or sorter 112 scans an indicia associated with the package 117 (such as a barcode) via the indicia reader 280 and then an intelligent pointer system 400 automatically generates a light spot to indicate to the delivery driver or sorter 112 where the package should be shelved and communicates the shelf-location to the computer device 220.

FIG. 6C is a flow chart depicting the operation of an intelligent pointer system 400 at load time in the delivery vehicle package locating system according to embodiments of the present invention. In Step 622, the intelligent pointer system 400 identifies a location for a package on a shelf and then sends the shelf-location information for the package to the computer device 220 (Step 624).

In some embodiments, the intelligent pointer system 400 is able to detect/confirm that the package has been placed at the spot indicated before communicating the shelf-location information to the computer device 220.

FIG. 9A is a diagram of an intelligent pointer system 400 according to an embodiment of the present invention. In this embodiment, the intelligent pointer system 400 comprises a light pointer 910, such as a 360 degree light pointer, that is mounted on the roof of the delivery vehicle 110, on one of the top shelves 113 in the delivery vehicle 110, or in the top corner of the delivery vehicle 110. As indicated earlier, in some embodiments, the light pointer 910 contains many light sources 920 that are able to generate a beam of light at a targeted location, light spot 930. In other embodiments, the light pointer 910 contains a single light source 920 that may be directed so as to generate the light spot 930.

When the delivery driver or sorter 112 scans an indicia 117 associated with the package 115 via the indicia reader 280, the intelligent pointer system 400 determines the location of empty shelf space in the delivery vehicle 110 where the package can be stored and uses the light source 920 of the light pointer 910 to generate a light spot 930 that indicates the spot in the vehicle where the delivery driver or sorter 112 should store the package (Step 622 in FIG. 6C). The network interface 465 of the intelligent pointer system 400 then sends the shelf-location information for the package to the computer device 220 (Step 624 in FIG. 6C).

In another embodiment of registering shelf-location information at load time, the delivery driver or sorter 112 scans an indicia 117 associated with the package 115 (such as a barcode) via the indicia reader 280 and then scans (again via the indicia reader 280) an indicia 111 (again, a barcode for example) associated with the shelf location where the package has been stored. The delivery vehicle package location system then has all of the information necessary for efficient delivery. The package has been correlated to both delivery-location information (the address of the customer for whom the package is intended) and the shelf-location information (the location where the package is stored in the delivery vehicle 110).

Figure 10A:
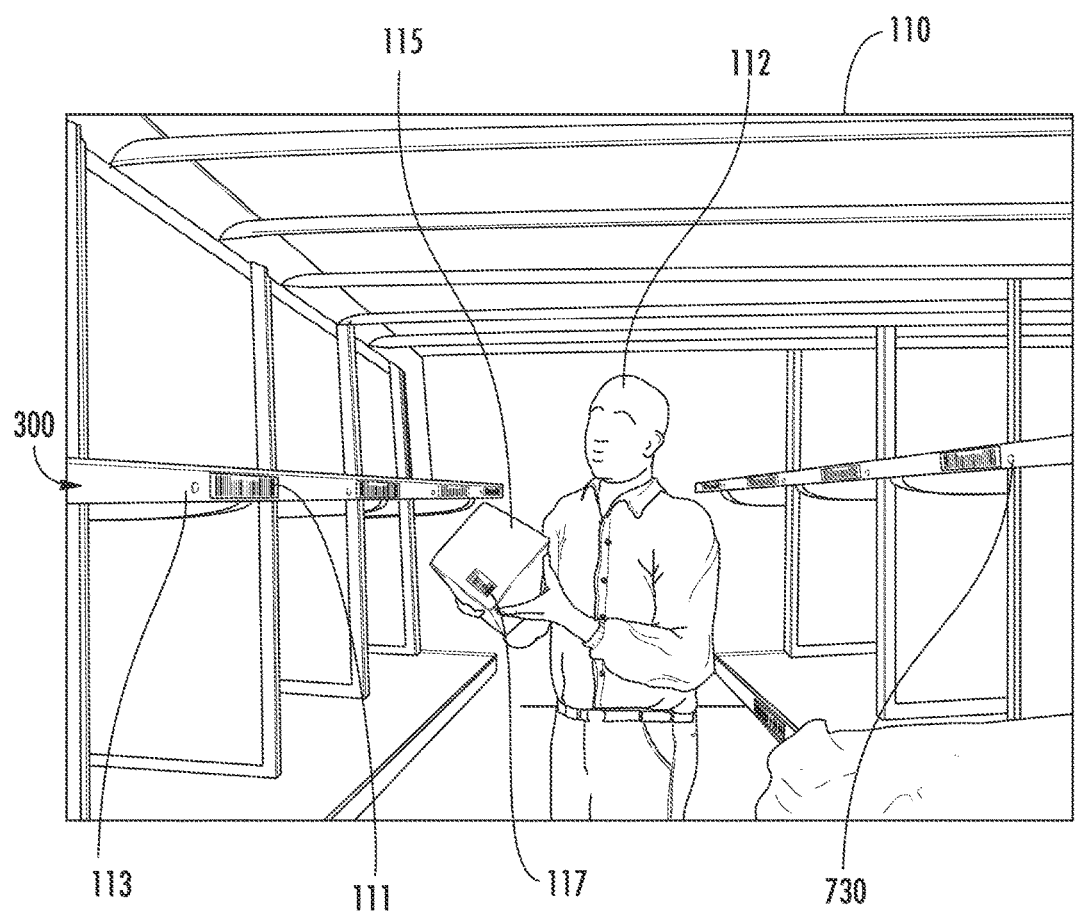
FIGS. 10A and 10B depict an exemplary shelving and package locating system for a delivery vehicle according to another embodiment of the present invention.

An example of this embodiment is captured in FIG. 6C and FIG. 10A. FIG. 6C has already been discussed above and will not be repeated in the interest of brevity, since the flow chart is similar in this embodiment. FIG. 10A illustrates an intelligent shelf system 300 according to an embodiment of the present invention. The intelligent shelf system 300 contains displays (e.g., E-ink displays) including indicia information 111. In this regard, the delivery driver or sorter 112 can scan the indicia information 111 associated with a shelf location via the indicia reader 280 as the package 115 is placed on the shelf 113 so that a computer can correlate the item 115 for delivery with its shelf location.

In still further embodiments of registering shelf-location at load time, the delivery driver or sorter 112 scans an indicia 117 associated with the package 115 (such as a barcode) via the indicia reader 280 and then a voice based module 250 in the device 220 directs the delivery driver or sorter 112 where to store the package in the delivery vehicle 110. In other embodiments, the delivery driver or sorter 112 can issue audible commands to the voice based module 250 in the device 220 to read either the entire or partial digits of an indicia 111 (such as a barcode) associated with a shelf location in the delivery vehicle 110. Again, this embodiment results with the delivery-information and shelf-location information being correlated for improved delivery. This embodiment is similar to what is shown in FIG. 10A, with the difference being that instead of procuring the shelf location using a scanned indicia 111, the shelf location is communicated using a voice based module 250.

Figure 6D:
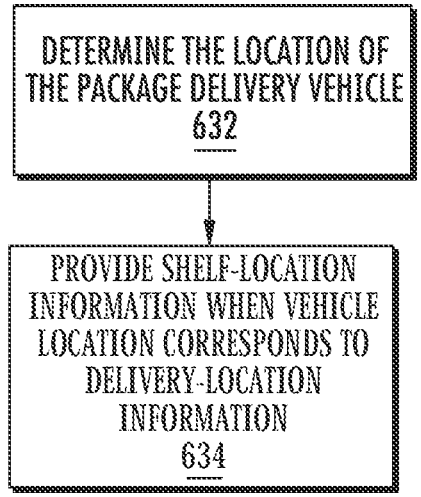
Figure 6E:
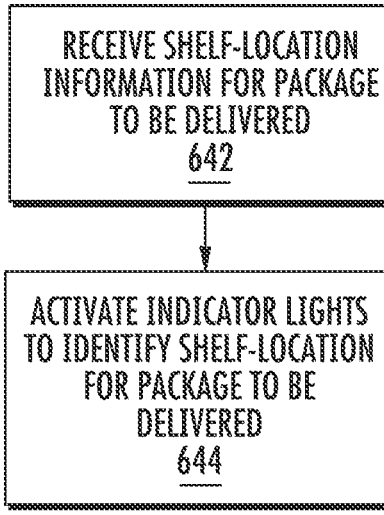

FIGS. 6D and 6E are flow charts illustrating the operation of certain elements the delivery vehicle package locating system at delivery time according to embodiments of the present invention.

FIG. 6D is a flow chart depicting the operation of computer device 220 at delivery time in the delivery vehicle package locating system according to embodiments of the present invention. In Step 632, the computer device 220 determines the location of the delivery vehicle 110, using the GPS receiver 290 associated with the computer device 220. The computer device 220 then provides shelf-location information when the vehicle location corresponds to delivery-location information for a package 115 in the manifest of the delivery vehicle 110 (Step 634).

In general, shelf-location information can be provided to the delivery driver 112 at delivery time in several ways.

One embodiment for providing shelf-location information at delivery time is captured in FIGS. 6E and 7C. FIG. 6E is a flow chart depicting the operation of the intelligent shelf system 300 at delivery time in the delivery vehicle package location system according to embodiments of the present invention. In step 642, when the vehicle 110 location corresponds to delivery location information, the intelligent shelf system 300 receives shelf-location information from the computer device 220 for the package 115 to be delivered. The intelligent shelf system 300 activates indicator lights to identify the shelf location for the package to be delivered (Step 644).

FIG. 7C shows that once the intelligent shelf system 300 receives the shelf-location information at delivery time from the computer device 220, it activates the indicator lights 730 that correspond to the width of the package to be delivered. In this manner, the delivery driver knows the location and approximate size of the package to deliver.

A similar embodiment for providing shelf-location information at delivery time is captured in FIGS. 6E and 8C. FIG. 6E has already been discussed above and will not be repeated in the interest of brevity, since the flow chart is similar in this embodiment. In FIG. 8C, the intelligent shelf system 300 also illuminates the correct indicator lights 730 at delivery time. FIGS. 7C and 8C differ only in package registration at load time (FIG. 7C uses light sensors 710 while FIG. 8C uses pressure sensors 810), but they use similar indicator lights 730 during package retrieval.

Figure 10B:
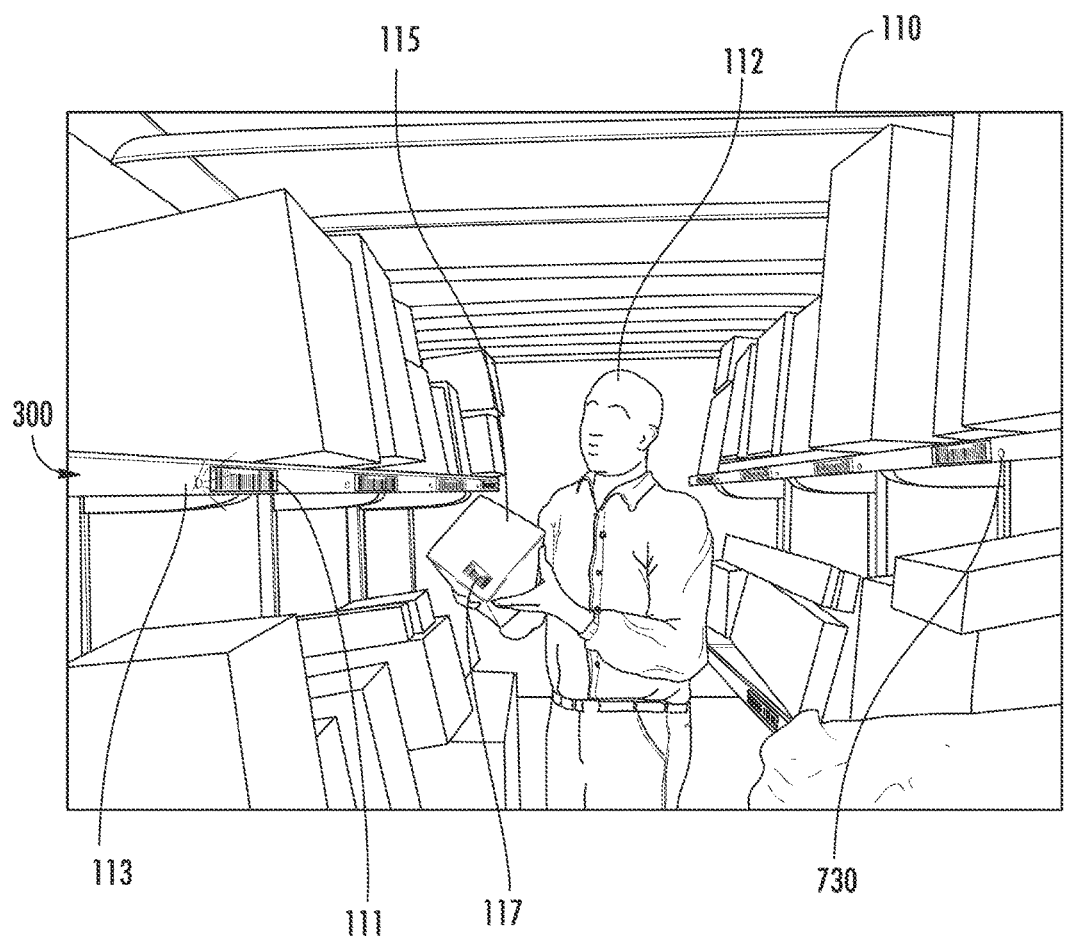

A similar embodiment for providing shelf-location information at delivery time is captured in FIGS. 6E and 10B. FIG. 6E has already been discussed above and will not be repeated in the interest of brevity, since the flow chart is similar in this embodiment. In FIG. 10B, the intelligent shelf system 300 also illuminates the correct indicator lights 730 at delivery time. In the particular embodiment shown in FIG. 10, only a single indicator light is lit to indicate the shelf location. Again, FIG. 10B differs from FIGS. 7C and 8C only in package registration at load time, but they use similar indicator lights 730 during package retrieval.

In alternative embodiments similar to that shown in the embodiment of FIG. 10B, the intelligent shelf system 300 may alert the driver as to the correct shelf location by way of display device 370. Alternatively, or in addition to location information being shown on display device 370, the respective shelves of the delivery vehicle 110 can be equipped with indicators (e.g., LEDs, electronic ink (E-Ink) displays, etc.) that direct the operator to the appropriate shelf. The intelligent shelf system 300 may also incorporate audible indicators to indicate the location of the correct package for the current delivery stop, using audio circuitry 461 and audio output 464.

Figure 9B:
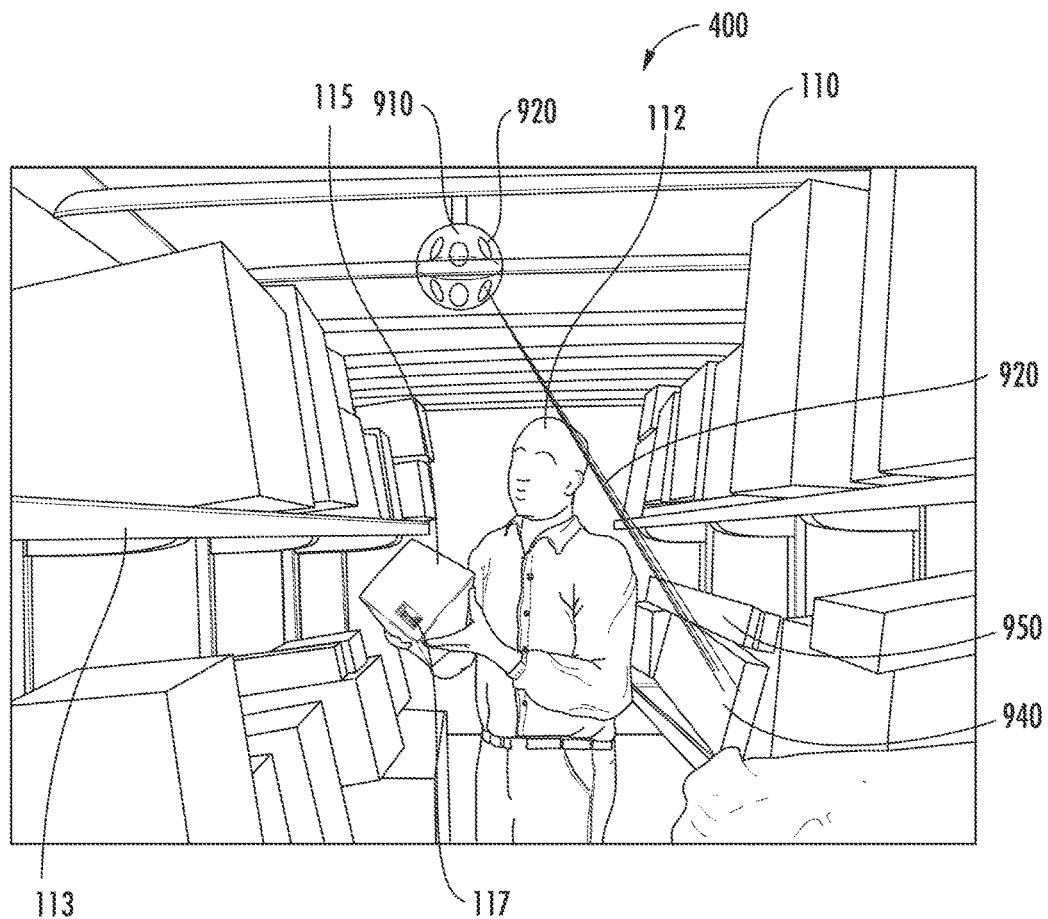

A similar embodiment for providing shelf-location information at delivery time is captured in FIGS. 6E and 9B. FIG. 6E has already been discussed above and will not be repeated in the interest of brevity, since the flow chart is similar in this embodiment. In FIG. 9B, the intelligent pointer system 400 generates a light spot 930 to indicate the correct shelf location for a package 115 to be delivered to the delivery driver 112. Note, that in some embodiments, the light spot can actually identify the specific package to be delivered (denoted Package A 940 in FIG. 9B). In other embodiments, the light spot 930 only generally indicates the shelf location, such as in the delivery of Package B 950.

The disclosed subject matter may be embodied as devices, systems, methods, and/or computer program products. Accordingly, some or all of the disclosed subject matter may be embodied in hardware and/or in software (including firmware, resident software, microcode, state machines, gate arrays, etc.). Furthermore, the disclosed subject matter may take the form of a computer program product on a computer-usable or computer-readable storage medium having computer-usable or computer-readable program code embodied in the medium for use by or on conjunction with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnet, optical, electromagnetic, infrared, or semiconductor system, apparatus, device or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically Erasable Programmable Read-Only Memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

* * *

To supplement the present disclosure, this application incorporates entirely by reference the following commonly assigned patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;

U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;

U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A delivery vehicle package locating system, the system comprising:
   a pularity of shelves for storing a plurality of packages, including at least a first shelf and a second shelf adjacent to the first shelf, wherein:
      each shelf comprises a plurality of indicator lights in a row;
      the first shelf comprises a plurality of emitting lights in a row along a first edge of the first shelf; and
      the second shelf comprises a plurality of light sensors in a row on a second edge of the second shelf, wherein each light sensor on the second edge of the second shelf corresponds to an emitting light on the first edge of the first shelf;
   a shelf control system communicatively coupled, via a shelf communication interface, to the plurality of indicator lights, the plurality of emitting lights, and the plurality of light sensors, and comprising a shelf processor and a shelf memory storing program codes;
   wherein the shelf control system is operable to:
      determine a width and a shelf-location of a package loaded on the first shelf based upon light from a plurality of the emitting lights on the first edge of the first shelf being blocked from corresponding light sensors on the second edge of the second shelf by the package; and
      send the width and the shelf-location information for the package to a computer system; and
   the computer system, comprising:
      a computer communication interface; and
      a computer control system communicatively coupled to the computer communication interface, and comprising a computer processor and a computer memory storing program codes;
      wherein the computer system is operable to:
         receive delivery-location information for the package;
         receive package identification information for the package;
         receive the width and the shelf-location information for the package from the shelf control system;
         correlate and store the delivery-location information, the package identification information, and the width and the shelf-location information for the package;
         determine vehicle-location information based upon current location of the delivery vehicle; and
         send the shelf-location information for the package to the shelf control system responsive to determining that the vehicle-location information corresponds with the delivery-location information for the package; and
   wherein the shelf control system is further operable to:
      receive the shelf-location information for the package from the computer system; and
      activate the indicator lights corresponding to the width and shelf-location of the package responsive to receiving the shelf-location information for the package from the computer system.

2. The system of claim 1, wherein the computer system is operable to:
   receive the current location of the delivery vehicle from a GPS unit in communication with the computer system; and
   receive the package identification information for the package from an indicia reader in communication with the computer system and operable for scanning an indicia on the package.

3. The system of claim 1, wherein the indicator lights are light emitting diodes (LEDs).

4. The system of claim 1, wherein the emitting lights are infrared emitting LEDs.

5. The system of claim 1, wherein the light sensors detect light from infrared LEDs.

6. The system of claim 2, wherein activating the indicator lights comprises causing the indicator lights to blink.

7. The system of claim 2, wherein activating the indicator lights comprises causing the indicator lights to light up.

8. A delivery vehicle package locating system, the system comprising:
   one or more shelves for storing a plurality of packages, wherein each shelf comprises:
      a plurality of indicator lights disposed in a row along each of the one or more shelves; and
      pressure sensors associated with surface area locations of the one or more shelves;
   a shelf control system communicatively coupled, via a shelf communication interface, to the plurality of indicator lights and the pressure sensors, and comprising a shelf processor and a shelf memory storing program codes;
   wherein the shelf control system is operable to:
      determine a width and a shelf-location of a package loaded on one of the shelves, wherein the width and the shelf location of the package is determined based upon weight of the package triggering a plurality of the pressure sensors of the one shelf; and send the width and the shelf-location information for the package to a computer system; and the computer system, comprising:
a computer communication interface; and
a computer control system communicatively coupled to the computer communication interface, and comprising a computer processor and a computer memory storing program codes;
wherein the computer system is operable to:
receive delivery-location information for the package;
receive package identification information for the package;
receive the width and the shelf-location information for the package from the shelf control system;
correlate and store the delivery-location information, the package identification information, and the width and the shelf-location information for the package;
determine vehicle-location information based upon current location of the delivery vehicle; and
send the shelf-location information for the package to the shelf control system responsive to determining that the vehicle-location information corresponds with the delivery-location information for the package; and
wherein the shelf control system is further operable to:
receive the shelf-location information for the package from the computer system; and
activate a plurality of the indicator lights corresponding to the width and shelf-location of the package responsive to receiving the shelf-location information for the package from the computer system.

9. The system of claim 8, wherein the computer system is operable to:
receive the current location of the delivery vehicle from a GPS unit associated with the computer system; and
receive the package identification information for the package from an indicia reader associated with the computer system and operable for scanning an indicia on the package.

10. The system of claim 8, wherein the indicator lights are light emitting diodes (LEDs).

11. The system of claim 8, wherein activating the indicator lights comprises causing the indicator lights to blink.

12. The system of claim 8, wherein activating the indicator lights comprises causing the indicator lights to light up.

13. The system of claim 8, wherein the one or more shelves comprise one or more floor areas of the delivery vehicle.

14. The system of claim 8, wherein:
the computer system is operable to receive a request for available shelf space in the delivery vehicle and send a request to the shelf control system for available shelf space on each of the one or more shelves;
the shelf control system is operable to, responsive to receiving the request from the computer system for available shelf space on each of the one or more shelves, determine the available shelf space on each of the one or more shelves based upon weight of packages triggering a plurality of pressure sensors on the one or more shelves, and send the determined shelf space to the computer system; and the computer system is further operable to:
receive the available shelf space on each of the one or more shelves from the shelf control system;
aggregate the available shelf space on each of the one or more shelves to create the available shelf space in the delivery vehicle; and
report the available shelf space in the delivery vehicle to a dashboard.

15. The system of claim 14, wherein the request for available shelf space in the delivery vehicle is received from an input device operably connected to the computer system.

16. The system of claim 15, wherein the dashboard is displayed on the computer system.

17. The system of claim 14, wherein the request for available shelf space in the delivery vehicle is received from a computer system associated with a dispatcher.

18. The system of claim 17, wherein the dashboard is displayed on the computer system associated with a dispatcher.

19. The system of claim 8, wherein each shelf further comprises grid lights.

20. The system of claim 19, wherein the computer system is further operable to:
activate the grid lights corresponding to the shelf-location of the package responsive to receiving the shelf-location information for the package from the computer system.

21. A delivery vehicle package locating system, the system comprising:
one or more shelves for storing a plurality of packages;
one or more light pointers, wherein each light pointer comprises:
a light pointer communication interface;
a light source; and
a light pointer control system communicatively coupled to the light pointer communication interface and the light source, and comprising a light pointer processor and a light pointer memory storing program codes;
wherein the light pointer control system is operable to:
identify a shelf-location for storing a package on one of the shelves during delivery, wherein the shelf-location is identified using a light spot generated by the light source for loading the package on the one shelf; and
send the shelf-location information for the package to a computer system; and the computer system, comprising:
a computer communication interface; and
a computer control system communicatively coupled to the computer communication interface and comprising a computer processor and a computer memory storing program codes;
wherein the computer system is operable to:
receive delivery-location information for the package;
receive package identification information for the package;
receive the shelf-location information for the package; and
correlate and store the delivery-location information, the package identification information, and the shelf-location information for the package.

22. The system of claim 21, wherein:
the computer system is further operable to:
determine vehicle-location information based upon current location of the delivery vehicle; and responsive to determining that the vehicle-location information corresponds with the delivery-location information for the package, send the shelf-location information for the package to the one or more light pointers; and each of the one or more light pointers is further operable to:

receive the shelf-location information for the package from the computer system; and identify the shelf-location of the package responsive to receiving the shelf-location information for the package from the computer system, wherein the shelf-location is identified using a light spot generated by the light source.

23. The system of claim 21, wherein the light source is adjustable.

24. The system of claim 21, wherein the light pointer comprises a plurality of light sources.

\* \* \* \* \*